(12) United States Patent
Pattanaik et al.

(10) Patent No.: US 10,055,446 B2
(45) Date of Patent: Aug. 21, 2018

(54) ENSURING DATA INTEGRITY OF EXECUTED TRANSACTIONS

(71) Applicant: The Bank of New York Mellon, New York, NY (US)

(72) Inventors: Sarthak Pattanaik, Bernardsville, NJ (US); Vadim Pertsovskiy, Chicago, IL (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 15/625,948

(22) Filed: Jun. 16, 2017

(65) Prior Publication Data
US 2017/0364552 A1   Dec. 21, 2017

Related U.S. Application Data

(60) Provisional application No. 62/351,065, filed on Jun. 16, 2016.

(51) Int. Cl.
*G06F 17/00*   (2006.01)
*G06F 17/30*   (2006.01)
(Continued)

(52) U.S. Cl.
CPC .... *G06F 17/30371* (2013.01); *G06F 11/1464* (2013.01); *G06F 17/3033* (2013.01); *H04L 9/3239* (2013.01); *G06F 2201/84* (2013.01)

(58) Field of Classification Search
CPC ................................................ G06Q 20/3678
See application file for complete search history.

(56) References Cited

U.S. PATENT DOCUMENTS

2015/0269570 A1   9/2015   Phan et al.
2015/0332283 A1   11/2015   Witchey
(Continued)

FOREIGN PATENT DOCUMENTS

KR   10-1628009 B1   6/2016

OTHER PUBLICATIONS

Giuseppe Di Battista, Valentino Di Donato, Maurizio Patrignani, Maurizio Pizzonia, Vincenzo Roselli, and Roberto Tamassia, "BitConeView: Visualization of Flows in the Bitcoin Transaction Graph", IEEE, pp. 1-8, 2015.*
(Continued)

*Primary Examiner* — Cheryl Lewis
(74) *Attorney, Agent, or Firm* — Fenwick & West LLP

(57) ABSTRACT

A central service provider manages a blockchain network that writes the cryptographic hash of each executed transaction in a block to the blockchain network. For each executed transaction, the central service provider generates and transmits a transaction receipt such that a party can verify that the transaction was appropriately executed. Additionally, a party can check that the party's records are correct by providing transaction data describing details of transactions recorded in the party's records to the central service provider. The central service provider verifies the party's records by comparing the transaction data in the party's records to the blocks of transaction records in the blockchain network. In some scenarios, the central service provider may identify or receive an identification of a discrepancy arising from one or more transactions. The central service provider can reconcile the identified discrepancy.

20 Claims, 16 Drawing Sheets

(51) Int. Cl.
 *G06F 11/14* (2006.01)
 *H04L 9/32* (2006.01)

(56) References Cited

U.S. PATENT DOCUMENTS

| | | |
|---|---|---|
| 2016/0098723 A1 | 4/2016 | Feeney |
| 2016/0164884 A1 | 6/2016 | Sriram et al. |
| 2017/0163733 A1* | 6/2017 | Grefen ................ H04L 67/1097 |
| 2017/0330174 A1* | 11/2017 | Demarinis ......... G06Q 20/3829 |

OTHER PUBLICATIONS

Joseph Krug and Jack Peterson, "Sidecoin: A Snapshot Mechanism for Bootstrapping a Blockchain", Google Scholar, 2015, pp. 1-3.*
Satoshi Nakamoto, "Bitcoin: A Peer-to-Peer Electronic Cash System", CiteSeerX, Mar. 2009, pp. 1-9.*
PCT International Search Report and Written Opinion, PCT Application No. PCT/US2017/038016, dated Sep. 27, 2017, 11 pages.

* cited by examiner

825

ENSURING DATA INTEGRITY OF EXECUTED TRANSACTIONS

TECHNICAL FIELD

This disclosure generally relates to data management, and more specifically to verifying the data integrity of executed transactions.

BACKGROUND

Transactional accounting systems track the quantity of assets held by various parties as well as the transfer of those assets between parties. The traditional implementation of these accounting systems include a relational database that tracks the various transactions and an overall balance table that monitors the quantity of assets held by each party. As each transaction is executed, the balance table is updated to reflect the transfer of assets corresponding to the transaction.

However, in conventional systems, both the quantity of an asset that is transferred in a transaction as well as the balance value of party are susceptible to being undesirably changed. These changes are often undetected and can be nefarious in nature (e.g., hacking), thereby causing significant adverse effects. In extreme cases, accounting systems can be the target of hacking systems that cause large-scale changes or even downtime in the accounting system. Additionally, in conventional systems, a transaction may be errantly executed. For example, a placed transaction may be mistakenly missed or an extra transaction may be accidentally executed.

SUMMARY

A central service provider manages a blockchain network that records details of executed transactions. In some embodiments, the central service provider executes the transactions themselves. Each transaction specifies the transfer of an asset and is placed by a party of the blockchain network. For each transaction, the central service provider applies a cryptographic hash algorithm to enforce the immutability of each executed transaction. For example, the central service provider generates a transaction record for each transaction, each transaction record including a hash value that represents an identifier of the immediately prior transaction record. In some scenarios, the immediately prior transaction record is the prior transaction record corresponding to a prior transaction placed by the party. The central service provider generates a block that includes a set of transaction records, where the block further includes a hash value that represents an identifier of an immediately preceding block in the blockchain. Each hash value representing an identifier of a block in the blockchain can be used to verify a full block of transactions.

In executing each transaction, the central service provider queries and updates a position table that represents the position of the asset held by each party in the blockchain network. Additionally, the central service provider identifies and updates one or more directed graphs that describe the positions of an asset held by parties of the blockchain network. Each directed graph provides a traceable lineage of an asset as it is transferred from one party to another. Because each asset has a traceable lineage, and transactions are hashed with one another, transactions may be reliably and verifiably applied to a party's positions. To identify the position of a party at a given time, the state of the blockchain at that time is readily re-created by returning to that portion of the blockchain, and because transactions are verified as they are applied to the blockchain, the transactions in the blockchain are reliable because of the traceable lineage.

In various embodiments, the one or more directed graphs are provided for display to provide a snapshot of the positions of the asset by each party at any given time during a transaction period. Additionally, the one or more directed graphs can be used to trace the transfer of the asset to reconcile one or more discrepancies that may arise during the execution of the transactions.

In various embodiments, the directed graphs are initialized each period and describe the position of an asset held by a party. In these embodiments, the one or more directed graphs are initialized and updated to reflect the transactions that occur during a transaction period. At the end of a transaction period, such as a trading day, the positions of an asset held by each party are accumulated across the directed graphs. At the beginning of a subsequent transaction period, each accumulated position of the asset held by a party is used to initialize a new directed graph. Therefore, the transactions that occur during the subsequent transaction period can be reflected in the one or more directed graphs, which can further be used to reconcile transactions during the subsequent transaction period.

Individual transactions recorded by the central service provider may be verified to ensure that each transaction was appropriately executed and recorded to the blockchain. The central service provider may receive a transaction request for a transaction from a party, the transaction request specifying various attributes of the transaction, such as asset type, quantity of the asset, and parties involved in the transaction. A hash value of the requested transaction, including its attributes, may be provided with the transaction request. The central service provider may also generate a hash value with the same attributes to match the submitted hash value and thereby verify that the transaction attributes received by the central service provider match the details of the transaction request. When the transaction is recorded on the blockchain, the central service provider generates a transaction receipt that can be provided to the requester. The transaction receipt specifies characteristics of the recorded transaction, such as a hash value of the previous block, recordation time stamp, prior transactions associated with the parties, as well as the prior hash value that was initially sent with the transaction request. These characteristics of the recorded transaction included in the transaction receipt may also be hashed to determine an identifier of the transaction receipt.

These identifiers of the transaction receipt (which are hash values corresponding to a previous transaction) may then be used to verify that the transaction was properly recorded. For example, the party verifies that the expected transaction information is correct and that identifiers of prior transaction receipts match.

In addition, to confirm that the party's records are correct, a party may provide a set of transactions, identifiers of the transactions, or details/attributes of the transactions to the central service provider such that the central service provider can determine any discrepancies between the party's records and the recorded transactions in the blockchain. Once transactions are recorded, because the transactions are characterized by the hash value of the requested transaction and the hash value of the recorded transaction, these hash values become immutable through the further use of these hash values in the blockchain. Modifications to the transactions are prevented because later transactions in the blockchain rely on these hash values. A party thus cannot readily modify a transaction because discrepancies will not match for the transaction receipt or the transaction request when compared to the transaction details recorded in the blockchain. As one application of this approach, the blockchain network of a central service provider may serve as a contingency system for a primary transactions database (e.g., primary recordation system) that maintains the positions of assets held by different parties. The primary recordation system can request and subsequently verify executed transactions and party positions with the central service provider that maintains the blockchain records. This permits the primary recordation system to maintain its role in servicing requests from various parties while the blockchain system of the central service provider provides additional transaction verification and confirmation.

The benefits of the implementation of the various embodiments described herein are several-fold. The secure management of cryptographically strong transactions ensures that unsupervised changes to transactions (e.g., asset quantities) are easily detected. Namely, if a single transaction is later changed, then the subsequent hash value of the next transaction is incorrect, and the hash value for the block also no longer matches the actual transactions in the block. Additionally, the data state of the blockchain maintained by the central service provider is further verified by client devices and can serve as a backup to a primary recordation system. Therefore, if a discrepancy arises (e.g., due to a missed, extra, or wrongful execution of a transaction or an unauthorized change), the discrepancy can be readily identified and traced.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
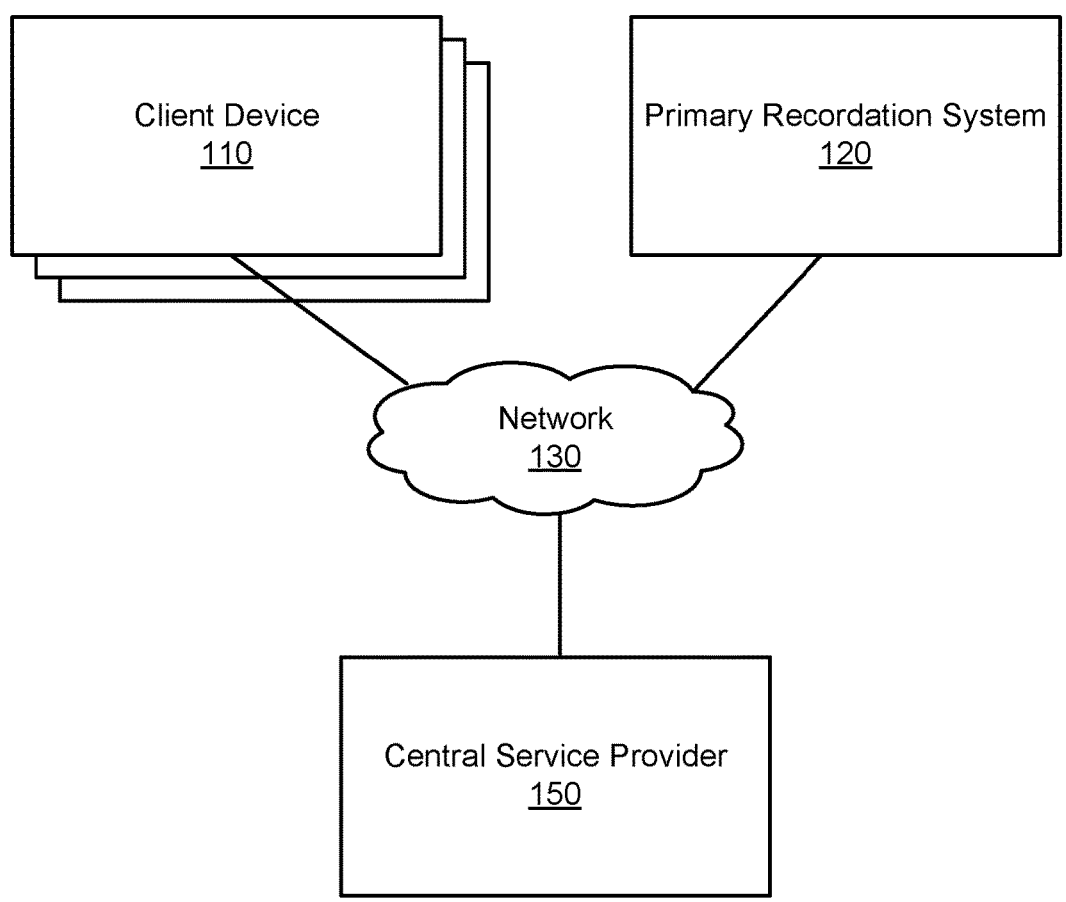
FIG. 1 depicts an overall system environment for managing verifiable and cryptographically strong transactions, in accordance with an embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "tree 405A," indicates that the text refers specifically to the element having that particular reference numeral. A reference numeral in the text without a following letter, such as "tree 405," refers to any or all of the elements in the figures bearing that reference numeral (e.g. "tree 405" in the text refers to reference numerals "tree 405A" and/or "tree 405B" and/or "tree 405C" in the figures).

Overall System Environment

FIG. 1 depicts an overall system environment 100 for managing verifiable and cryptographically strong transactions, in accordance with an embodiment. The system environment 100 can include one or more client devices 110, a primary recordation system 120, and a central service provider 150 interconnected through a network 130. Generally, a central service provider 150 receives transaction requests sent by a client device 110. The central service provider 150 writes the details of each transaction to a block on a blockchain. Additionally, the central service provider 150 can update one or more traceable directed graphs and/or a position table to reflect each executed transaction.

The primary recordation system 120 may also receive transaction requests sent by a client device 110 and records the transactions by storing transaction information as well by maintaining and updating a ledger. In various embodiments, the primary recordation system 120 does not update traceable directed graphs in recording a transaction.

In recording details of transactions to an immutable blockchain, the central service provider 150 serves as a backup system for the primary recordation system 120 to ensure that executed transactions are traceable and to provide additional transaction verification. Additionally, each client device 110 that sends a transaction request can verify that the transaction request was correctly executed. If either the client device 110 or the central service provider 150 identifies a discrepancy that arose due to one or more executed transactions, a notification is sent to reconcile the discrepancy.

Network

The network 130 facilitates communications between the various client devices 110 and central service provider 150. The network 130 may be any wired or wireless local area network (LAN) and/or wide area network (WAN), such as an intranet, an extranet, or the Internet. In various embodiments, the network 130 uses standard communication technologies and/or protocols. Examples of technologies used by the network 130 include Ethernet, 802.11, 3G, 4G, 802.16, or any other suitable communication technology. The network 130 may use wireless, wired, or a combination of wireless and wired communication technologies. Examples of protocols used by the network 130 include transmission control protocol/Internet protocol (TCP/IP), hypertext transport protocol (HTTP), simple mail transfer protocol (SMTP), file transfer protocol (TCP), or any other suitable communication protocol.

Client Device

The client device 110 is an electronic device such as a server computer, personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computer functionality, such as a personal digital assistant (PDA), mobile telephone, smartphone, etc. The client device 110 may execute instructions (e.g., computer code) stored on a computer-readable storage medium. A client device 110 may include one or more executable applications, such as a web browser, to interact with services and/or content provided by the central service provider 150. In another scenario, the executable application may be a particular application designed by the central service provider 150 and locally installed on the client device 110. As one particular scenario, a user of the client device 110 may register with the central service provider 150 using a user identifier and password to become a party of the private blockchain. Although one client device 110 is illustrated in FIG. 1, in other embodiments the environment 100 may include more than one client device 110. For example, the central service provider 150 may communicate with millions of client devices 110 through the network 130 in providing and receiving various transaction-related data.

Generally, a client device 110 is associated with a party. A client device 110 can be used by a user (or party) to perform various functions such as send a transaction request that specifies a transfer of assets, receive a transaction receipt describing an executed transaction, or verify that an executed transaction was appropriately written in a block of the blockchain. In some embodiments, the party uses the client device 110 to register with the blockchain network. Such functions can be performed in relation to the central service provider 150 (e.g., send a transaction request to the central service provider 150 or receive a transaction receipt from the central service provider 150).

Figure 2A:
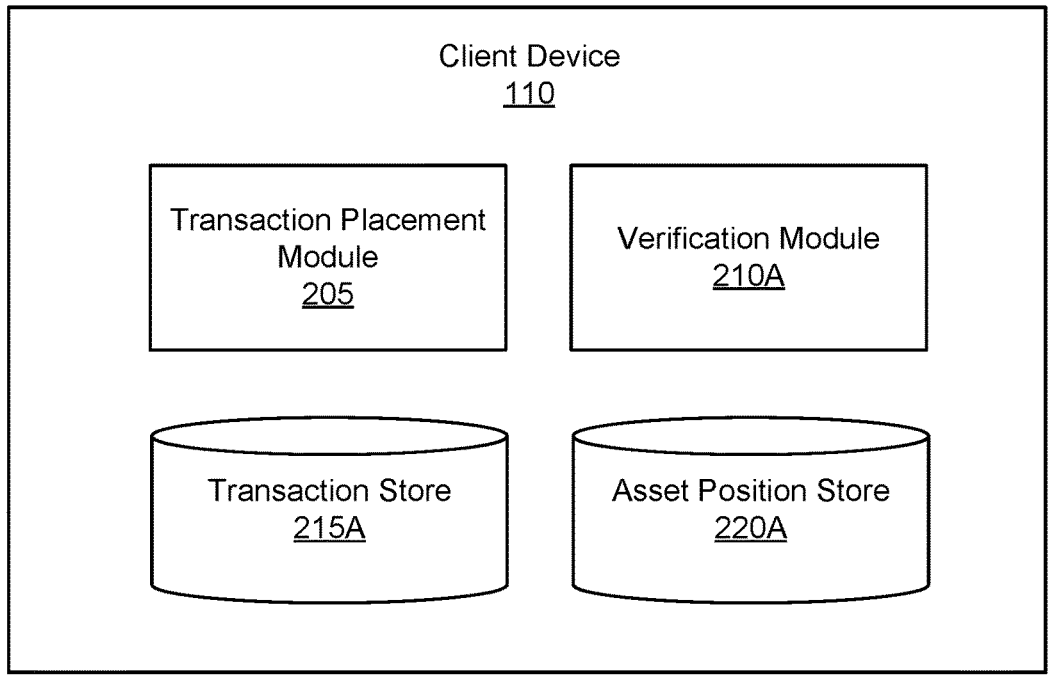
FIG. 2A depicts an example block diagram of a client device, in accordance with an embodiment.

Referring to FIG. 2A, the client device 110 includes a transaction placement module 205, a verification module 210A, a transaction store 215A, and an asset position store 220A for performing these functions. In some embodiments, the client device 110 includes additional or fewer modules for performing the functions. As an example, the client device 110 may further include a user interface for receiving interactions specifying a transaction order and for displaying details of executed transactions that have been verified.

The transaction placement module 205 places a transaction by sending a transaction request that specifies a transfer of an asset. The transaction placement module 205 can send a transaction request to the primary recordation system 120, to the central service provider 150, or to both. In various embodiments, a transaction request includes various attributes of a transaction including an asset type and a quantity of the asset to be transferred. Examples of an asset may be stock, bonds, securities (e.g., call option or put option), mutual funds, loans, deposits (e.g., certificate of deposits), bills (e.g., treasury bills), and the like. In some embodiments, the transaction placement module 205 sends a transaction request on behalf of the party that is associated with the client device 110. Therefore, in this scenario, attributes of a transaction included in a transaction request can further specify one or more parties as well as a direction of transfer (e.g., transferring the asset to or from the party). In various embodiments, attributes of the transaction further specify conditions associated with the transaction. For example, the conditions can include the price of the asset or any notes of the transaction. As another example, if the asset is a call or put option, the transaction further specifies an agreed-upon price at a specified date. In some embodiments, attributes of a transaction further include a timestamp applied by the transaction placement module 205 corresponding to when the transaction request was sent.

The transaction placement module 205 represents the transaction using a unique transaction request identifier, which can further be an attribute included in the transaction. As one example, the unique transaction request identifier is a hash value representing the content in the transaction. The hash value can be generating using one of a message digest algorithm 5 (MD5), a secure hash algorithm (SHA) algorithm (e.g., SHA-0, SHA-1, SHA-2, or SHA-3), BLAKE, or other hash functions of the like. In one embodiment, the unique transaction request identifier is a hash value generated using a SHA 256 function. The hash value represents the aforementioned attributes of the transaction including an identification of a first party, an identification of a second party, the asset type, the quantity of asset to be transferred, the conditions of the transaction, and the associated timestamp. The transaction placement module 205 can transmit the transaction request through the network 130 to the central service provider 150.

In various embodiments, the transaction placement module 205 stores information corresponding to the sent transaction requests in the transaction store 215A. For example, the transaction placement module 205 stores each unique transaction request identifier in a continuously updated list. The list may further specify the order of each transaction. In some embodiments, the transaction placement module 205 maintains a list of transactions in a local blockchain. In other words, the transaction placement module 205 can generate a hash value representing each transaction in the local blockchain such that each transaction includes a hash value of the immediately prior transaction in the block. Additionally, each block in the blockchain can contain a hash value of the immediately prior block in the blockchain.

Additionally or alternatively, the transaction placement module 205 can update and maintain a locally-stored ledger such as a position table that reflects the position of one or more assets held by the party associated with the client device 110. The transaction placement module 205 stores the local ledger in an asset position store 220A. Therefore, for each transaction in a sent transaction request, the transaction placement module 205 updates the local ledger to reflect the position of the assets held by the party in view of the transaction.

The client device 110 further receives transaction receipts from a central service provider 150 indicating that one or more transactions have been executed and the details of the transaction were written to the blockchain. Therefore, the client device 110 can verify that the details of the transaction were appropriately written to the blockchain. The client device 100 employs a verification module 210A and a transaction store 215A for the verification process. Further details regarding the verification process are described below in regards to FIGS. 7A and 7B.

Primary Recordation System

The primary recordation system 120 is an electronic device, such as one or more server computers, that is associated with the central service provider 150. As an example, the primary recordation system 120 may be operated in conjunction with the central service provider 150. For example, a user of the central service provider 150 can similarly be a user of the primary recordation system 120.

The primary recordation system 120 receives transaction requests sent by client devices 110 and records details of each executed transaction. Generally, the primary recordation system 120 stores transaction data for each transaction. Specifically, transaction data for each transaction may include an identifier of the transaction, such as the unique transaction request identifier sent in a transaction request from the client device 110, and attributes of the transaction. Additionally, the primary recordation system 120 updates a local ledger, such as a position table, that tabulates the position of one or more assets held by various parties. For each transaction, the primary recordation system 120 updates the local ledger (e.g., remove quantity of an asset from party 1, add quantity of the asset to party 2) to reflect the transaction in the received transaction request.

Of note, given that the central service provider 150 executes transactions and writes details of the transactions to an immutable blockchain, errors that arise due to a misrecorded transaction are likely due to one of an error or nefarious activity (e.g., hacking or manipulation) on the primary recordation system 120. In various embodiments, the primary recordation system 120 may query the central service provider 150 by sending transaction data of transactions recorded by the primary recordation system 120 such that the central service provider 150 can verify that the transactions recorded by the primary recordation system 120 are correct. In some embodiments, the primary recordation system 120 queries the central service provider 150 at fixed time intervals. The fixed timer interval may match a time period for which the central service provider 150 generates a block of transaction records. Therefore, the primary recordation system 120 can query and ensure that recorded transactions corresponding to blocks of transaction records on the blockchain have been accurately recorded by the primary recordation system 120. The primary recordation system 120 may receive a notification specifying one or more discrepancies arising from a transaction recorded by the primary recordation system 120 and therefore, can reconcile any discrepancies identified by the central service provider 150.

Figure 2B:
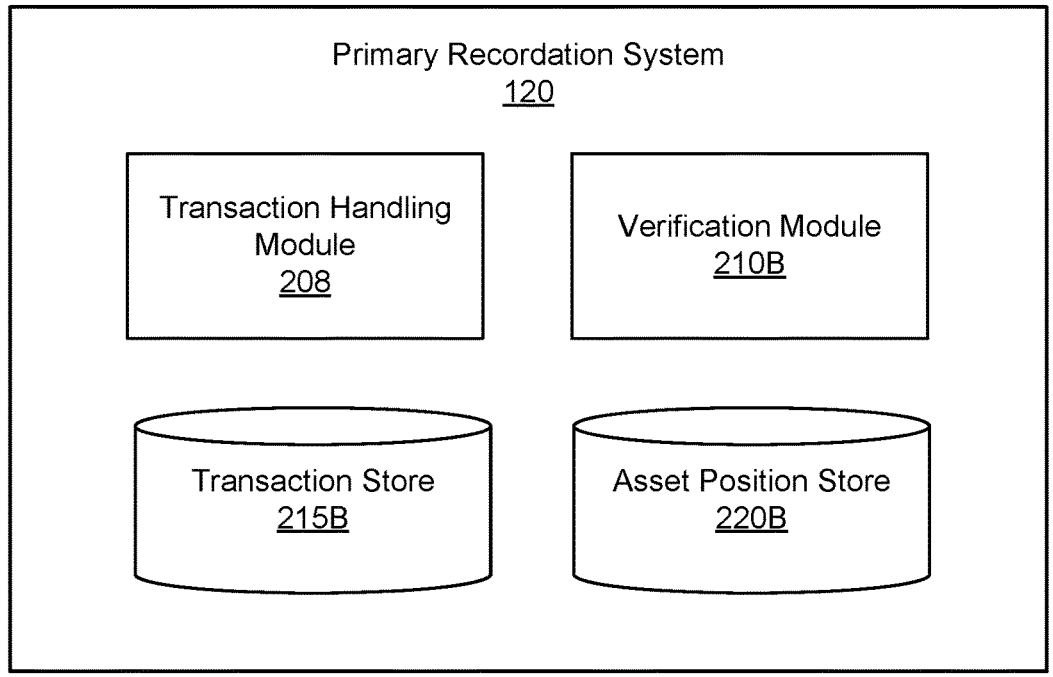
FIG. 2B depicts an example block diagram of a primary recordation system for verifying and supporting the central service provider, in accordance with an embodiment.

Referring to FIG. 2B, the primary recordation system 120 includes a transaction handling module 208, a verification module 210B, a transaction store 215B, and an asset position store 220B for performing verification processes. For example, the transaction handling module 208 of the primary recordation system 120 generates and stores transaction data in the transaction store 215B. Additionally, the transaction handling module 208 can maintain and update a ledger (e.g., stored in asset position store 220B) that tracks asset quantities for each party. Further details regarding the handling and verification of transactions by the transaction handling module 208 and verification module 210B are described below in regards to FIGS. 8A and 8B.

Central Service Provider

The central service provider 150 is one or more electronic devices associated with an institution such as a bank, asset management firm, financial services corporation, or central clearing agent). The central service provider 150 receives requests for transactions for its customers, who are able to send transaction requests using client devices 110, as described above. Generally the central service provider 150 processes the received transactions such that the transactions are verifiable and cryptographically strong. In one embodiment, the central service provider 150 serves as a recordation system for recording executed transactions. In another embodiment, the central service provider 150 executes transactions in addition to serving as a recordation system for recording the executed transactions. Specifically, the central service provider 150 writes details of the executed transactions within encrypted blocks to a blockchain such that changes to any details of the transactions written to the blockchain can be detected. Additionally, the central service provider 150 generates directed graphs that each describe a traceable lineage of an asset as it is transferred to and from different parties. Thus, this enables the central service provider 150 to easily reconcile executed transactions by tracing the lineage of the asset in the directed graphs.

In various embodiments, the central service provider 150 maintains a private blockchain network. In other words, parties of the private blockchain undergo a validation process and therefore, each transaction received from a party (e.g., client device 110) of the private blockchain is assumed to trustworthy and need not be verified upon receipt by the central service provider 150. Each block of transactions written onto the blockchain by the central service provider 150 is immutable, thereby ensuring that the details of the executed transactions are secure and cryptographically strong.

Figure 3:
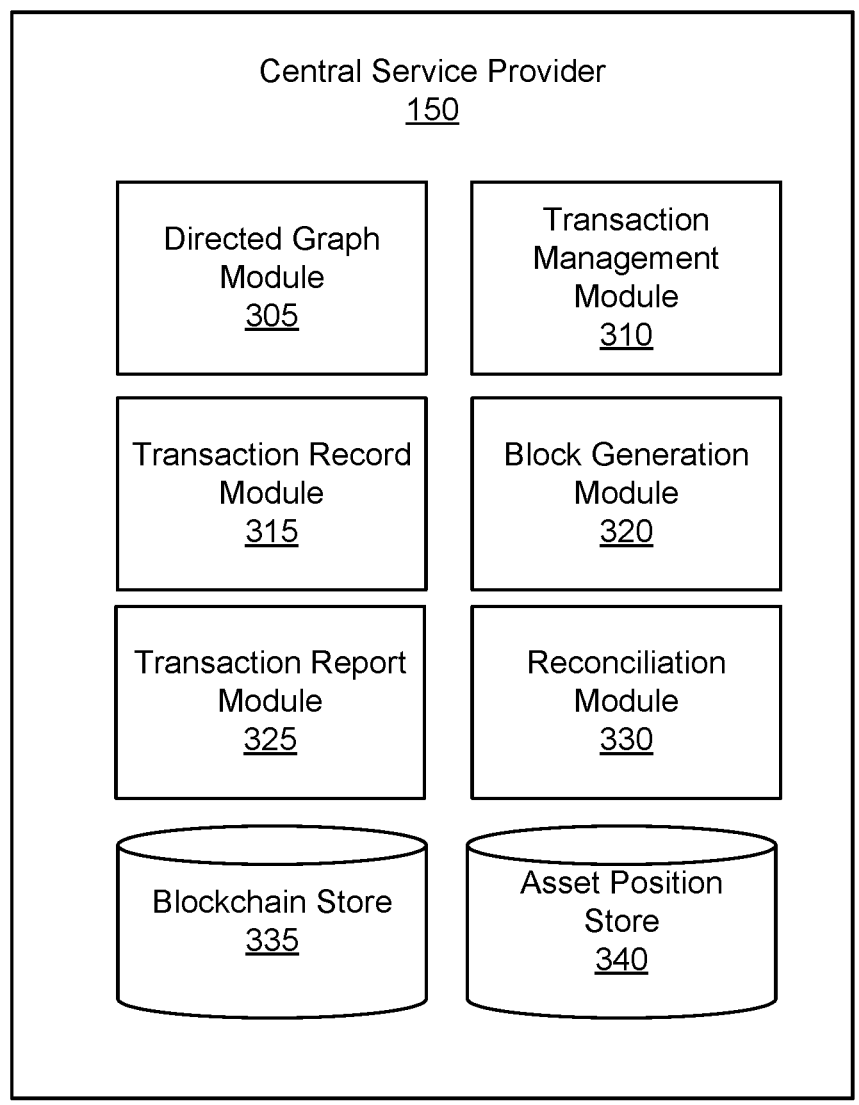
FIG. 3 depicts an example block diagram of a central service provider, in accordance with an embodiment.

Referring now to FIG. 3, it depicts an example block diagram of a central service provider 150, in accordance with an embodiment. In this embodiment, the central service provider 150 includes a directed graph module 305, a transaction management module 310, a transaction record module 315, a block generation module 320, a transaction receipt module 325, and a reconciliation module 330. The methods performed by each module of the central service provider 150 are described below.

Managing Transactions by the Central Service Provider

Directed Graphs

The directed graph module 305 initializes a set of directed acyclic graphs for one or more parties at the beginning of a transaction period, such as a trading session. Generally, a set of directed graphs describes the positions of an asset (e.g., stocks or bonds) held by each of the one or more parties. Each asset type may be represented by a different set of directed graphs. At the beginning of each transaction period, the directed graph module 305 initializes an initial value representing a quantity of the asset held by each party. During the transaction period, the directed graph module 305 maintains the set of directed graphs to reflect the details of the executed transactions that are written to the blockchain. For example, the directed graph module 305 maintains nodes and directional edges in the directed graph that reflect the transfer of assets of executed transactions. In various embodiments, the directed graph module 305 assigns a quantity of an asset to a node or to an edge. For example, a quantity of an asset assigned to a node represents the position of the asset held by the party corresponding to the node. A quantity of an asset assigned to an edge represents the quantity of the asset being transferred from the first node through the edge to the second node.

At the end of each transaction period, the directed graph module 305 accumulates the positions for an asset held by each party across the set of directed graphs such that the directed graph module 305 can re-initialize the set of directed graphs at the beginning of a subsequent time period using the accumulated position of the asset held by each party. The subsequent description refers to directed graphs in a set of directed graphs. However, in various embodiments, the directed graph module 305 initializes multiple sets of directed graphs to process transactions for various types of assets that are managed by the central service provider 150.

Figure 4A:
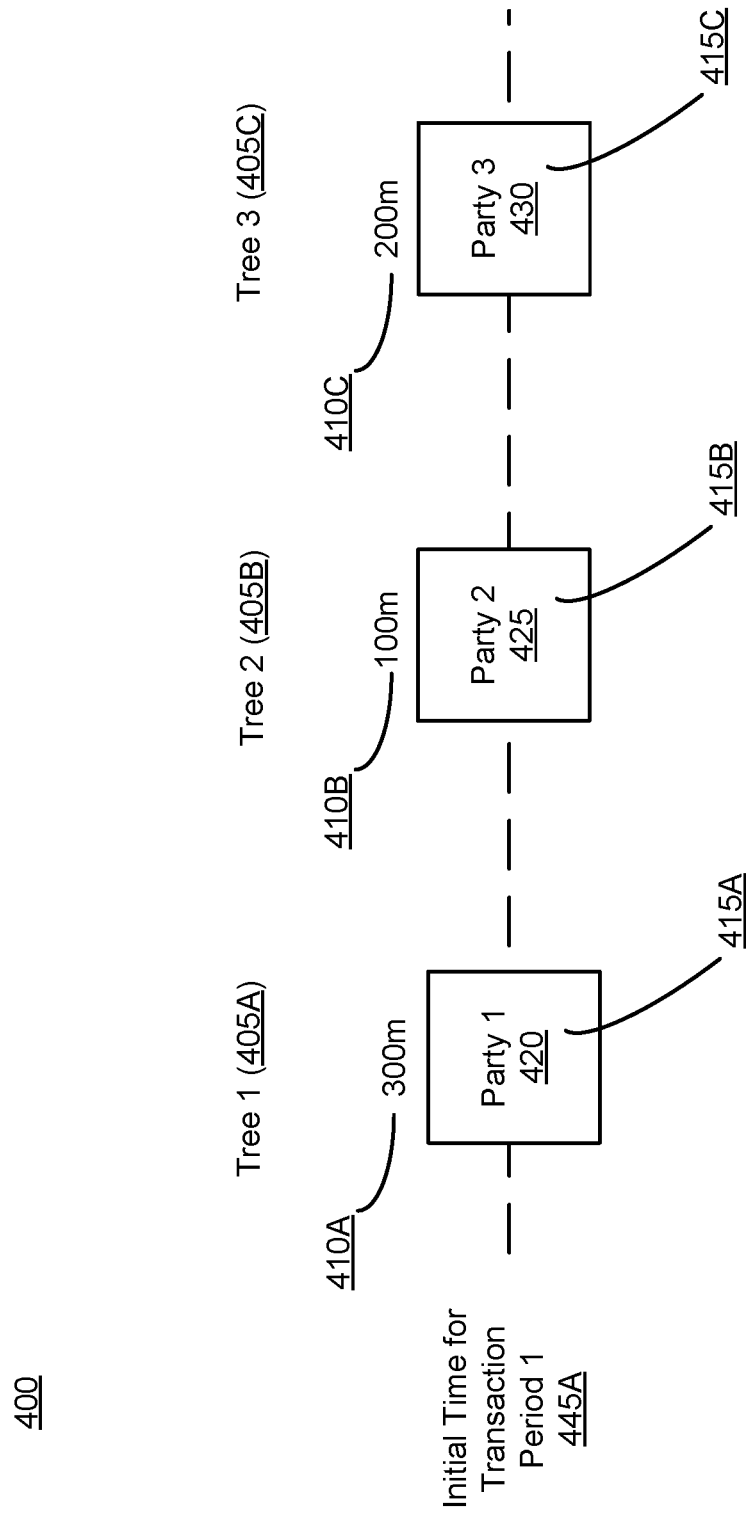
FIG. 4A is an example initial interface including directed graphs that each depict initial positions of an asset held by various parties, in accordance with an embodiment.
Figure 4B:
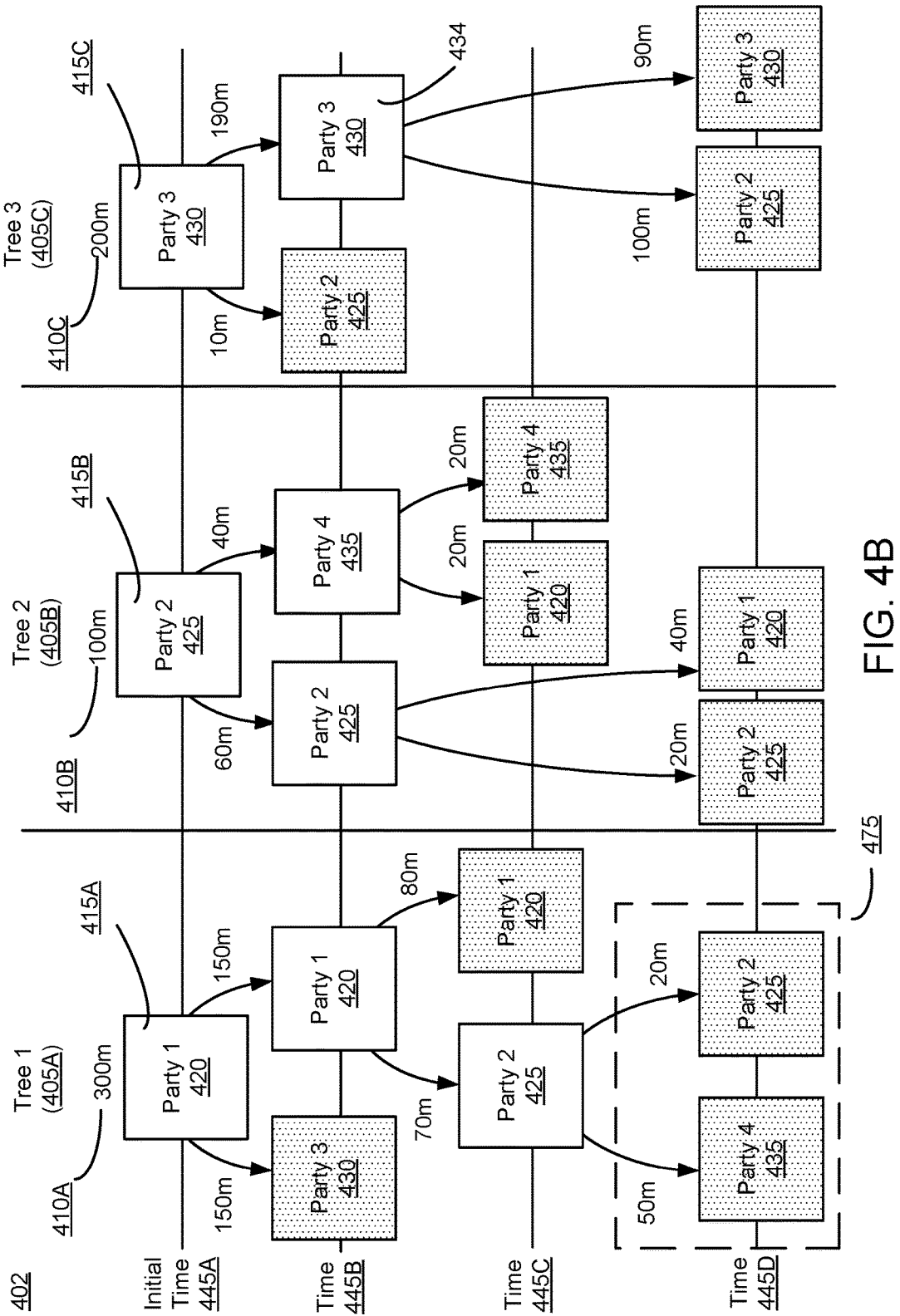
FIGS. 4B and 4C each depicts an example interface including directed graphs that depict positions of an asset held by various parties at the end of a transaction period, in accordance with an embodiment.

Reference is made to FIG. 4A, which is an example initial interface 400 of directed graphs that each depict initial positions of an asset held by various parties, in accordance with an embodiment. The interfaces shown in FIG. 4A and subsequent FIG. 4B show interfaces for illustrating the change in assets for parties over time. Specifically, FIG. 4A depicts one example of multiple directed graphs that are embodied as trees (e.g., tree 1 (405A), tree 2 (405B), and tree 3 (405C)).

The directed graph module 305 initializes an initial quantity of the asset held by each party in the tree. In this example, at the beginning of a time period, each party is associated with a tree designating that party's initial position. For example, as shown in FIG. 4A, each tree 405 includes a root node 415 that represents the initial position 410 of an asset held by a party associated with the tree 405. For example, as shown in FIG. 4A, tree 1 (405A) represents the initial position 410A of the asset (e.g., 300 m) held by party 1 (420), tree 2 (405B) represents the initial position 410B of the asset (e.g., 100 m) held by party 2 (425), and tree 3 (405C) represents the initial position 410C of the asset (e.g., 200 m) held by party 3 (430). Although FIG. 4A only depicts three separate trees 405, in various embodiments, there are fewer or more trees 405 depending on the number of parties in the blockchain network. As an example, if there are N parties registered with the blockchain network, then there may be N total trees 405 in the interface 400. When a new party registers and joins as a party of the blockchain, the directed graph module 305 can initialize a new directed graph for the new party.

In various embodiments, the directed graph module 305 initializes a directed graph at the beginning of a transaction period. A transaction period refers to the interval between the beginning and end of a trading session. As an example, the transaction period is a trading day during which assets are exchanged. Therefore, the initial position 410 of an asset held by a party represents the quantity of an asset in the party's possession at the beginning of a transaction period. As shown in FIG. 4A, each root node 415 of each tree 405 is aligned at an initial time 445A that represents the beginning of the transaction period.

At the end of a transaction period, the directed graph module 305 sums the positions of the asset held by a party across multiple directed graph to obtain an accumulated position of the asset held by a party for that transaction period. Thus, the directed graph module 305 can use the accumulated position of the asset for each party to re-initialize the directed graphs for the next transaction period.

FIG. 4B shows an example final interface 402 of directed graphs that depict positions of an asset held by various parties at the end of a transaction period, in accordance with an embodiment. In transitioning from the beginning of the transaction period (e.g., FIG. 4A) to the end of the transaction period (e.g., FIG. 4B), multiple transactions were executed across multiple times 445.

The final interface 402 of directed graphs can include one or more nodes (e.g., depicted in FIG. 4A as squares) that each corresponds to a party (e.g., party 1 (420), party 2 (425), party 3 (430), or party 4 (435)). Additionally, the final interface 402 can include edges (e.g., depicted in FIG. 4B as directional arrows) that connect two nodes. The generation of the nodes and edges that correspond to a transaction are described in further detail below in regards to the transaction management module 310. In various embodiments, a subset of the nodes in each tree 405 are terminal nodes (e.g., depicted in FIG. 4B as shaded nodes). Each terminal node indicates the end of a traceable lineage of the asset. In other words, each terminal node does not include a further transfer of an asset to another party and therefore, is the final node in the tree 405. As depicted in FIG. 4B, each tree 405 can have two or more terminal nodes.

Referring to tree 1 (405A) in FIG. 4B, a transaction is represented by the transfer from an asset from the root node 415A representing party 1 (420) to two daughter nodes. Specifically, the initial position 410A (e.g., 300 m) of the asset held by party 1 (420) is divided amongst a first daughter node (e.g., party 3 (430)) and a second daughter node (e.g., party 1 (420)), thereby indicating that part 1 (420) transferred 150 m of the asset to party 3 (430) while holding onto the remaining 150 m of the asset. In various embodiments, such as the embodiment shown in FIG. 4B, a single transaction in the directed graph can be represented by three nodes and two edges.

As shown in FIG. 4B, each node in the interface 402 aligns with a particular time 445 whereas the edges that indicate the transfer of assets connects the nodes between the designated times 445. Therefore, each node indicates the position of an asset held by a party at that time 445. For example, referring to tree 1 (405A), root node 415A that represents party 1 (420) indicates that party 1 (420) holds a quantity of 300 m of an asset at initial time 445A. After executing the transaction, at subsequent time 445B, party 3 (430) now holds 150 m of the asset and party 1 (420) holds 150 m of the asset. Subsequent transactions are similarly represented across the different time 445 in FIG. 4B. In various embodiments, the interface 402 can depict an edge that traverses multiple time periods. For example, if a party holds a quantity of an asset for extended periods of time, then the subsequent transaction may be represented using an edge that traverses the extended periods of time. Specifically, node 434 in FIG. 4B depicts an example of such a transaction. Node 434, which represents party 3 (430), is assigned the position of 190 m of the asset at time 445B. That quantity of the asset is held across time 445C until time 445D when 100 m of the asset is transferred from party 3 (430) to party 2 (425). Therefore, the edges depicting this transaction traverse time 445C in demonstrating the timing of the transaction.

In various embodiments, each time 445A-D corresponds to a timestamp assigned to received transactions. In one embodiment, the duration of time between each timestamp can range between 30 seconds up to 30 minutes. In particular embodiments, the duration of time between each timestamp is 5 or 10 minutes.

Figure 4C:
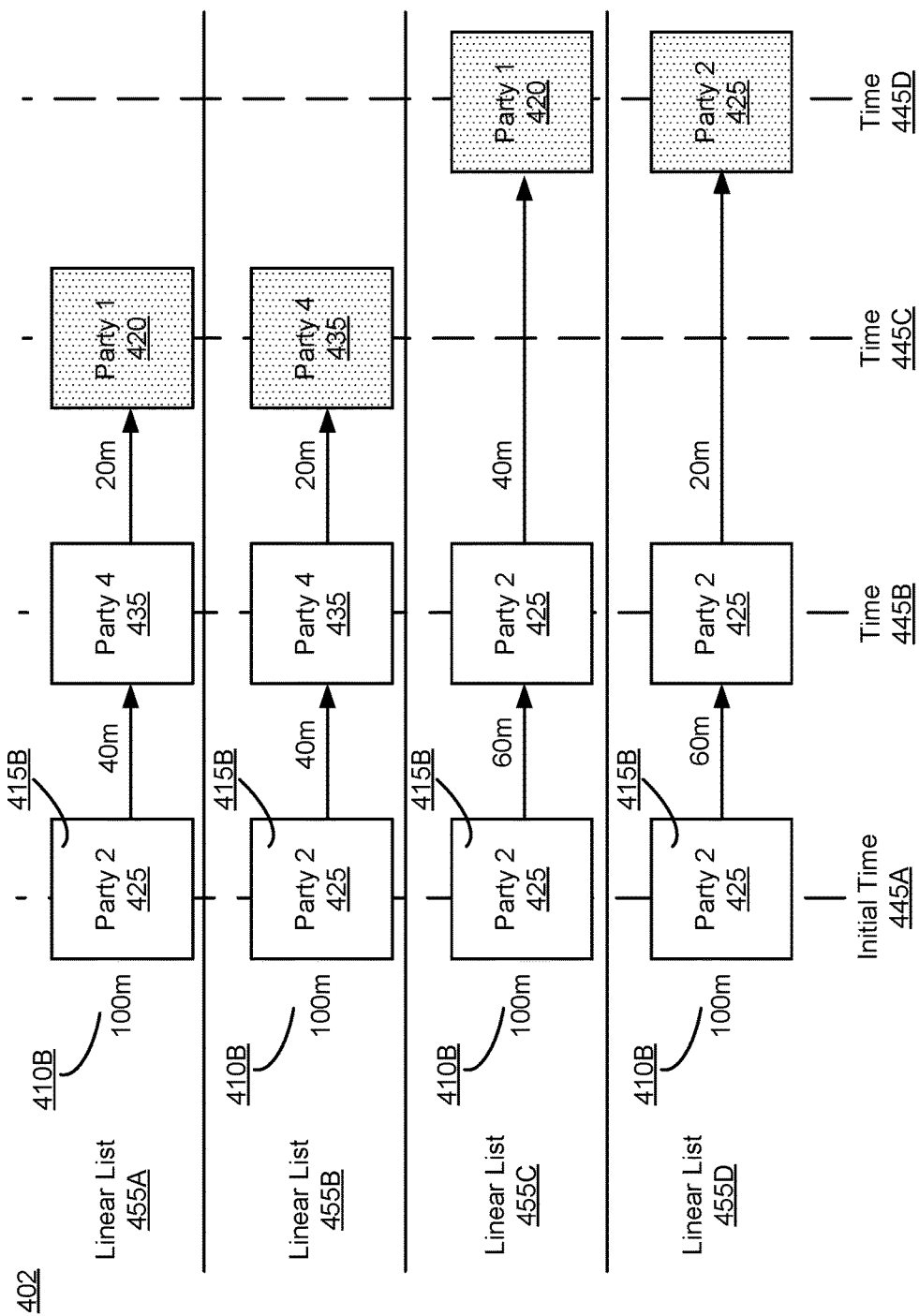

Although FIGS. 4A and 4B each depicts an interface 400 and 402 that includes directed graphs that are embodied as individual trees 405, other embodiments may depict other forms of directed graphs. For example, in another embodiment as shown in FIG. 4C, directed graphs are depicted as linear lists. In particular, the linear lists 455A-D shown in FIG. 4C correspond to the nodes and edges of tree 2 (405B) as shown in FIG. 4B.

In this embodiment, each linear list 455 includes a root node, which in FIG. 4C is a root node 415B that represents party 2 (425). Each root node 415B is assigned an initial position 410B (e.g., 100 m) that represents the position of the asset held by the party (e.g., party 2 (425)). Additionally, each linear list 455 includes a terminal node (e.g., shaded node) that represents the position of the asset held by a party at the end of a transaction period. Each linear list 455 can include one or more nodes between the root node 415B and the terminal node that represent the intermediary parties that transferred the asset to arrive at the terminal node.

A single transaction may be depicted across multiple linear lists and encompass many nodes and edges. For example, party 2 (425) begins with an initial position 410B (e.g., 100 m) of an asset. Each of the four linear lists 455 can represent the transaction of 40 m of the asset to party 4 (435) while party 2 (425) retains the remaining 60 m of the asset. More specifically, each of linear list 455A and 455B depicts the transfer of 40 m of the asset from party 2 (425) to party 4 (435) whereas each of linear list 455C and 455D depicts the retention of 60 m of the asset by party 2 (425). Each linear list 455 then further branches out to depict a subsequent transaction that occurs. For example, as shown in linear lists 455A and 455B, at time 445B, party 4 (435) then transfers 20 m of the asset to party 1 (420) while retaining 20 m of the asset. Also, as shown in linear lists 455C and 455D party 2 (425) transfers 40 m of the asset to party 1 (420) while retaining 20 m of the asset. The last transaction that leads to a terminal node can be represented across two linear lists 455. The second to last transaction that leads to a last transaction can be represented across four linear lists 455. Generally, the position of the trees for the Nth transaction can be represented by a set of $2^N$ linear lists 455 (since each transaction may branch a tree).

In each of the example interfaces 402 depicted in FIGS. 4B and 4C, the directed graph initialized and maintained by the directed graph module 305 provides a traceable lineage of an asset as it is transferred from party to party. Specifically, in both embodiments, each directed graph of the interface 402 provides a root node 415 of a party that is assigned an initial position 410 of an asset held by the party. Therefore, the directed graph can be used to reconcile any identified discrepancies by tracing the lineage of an asset back to the root node 415 of the interface 402.

Figure 4D:
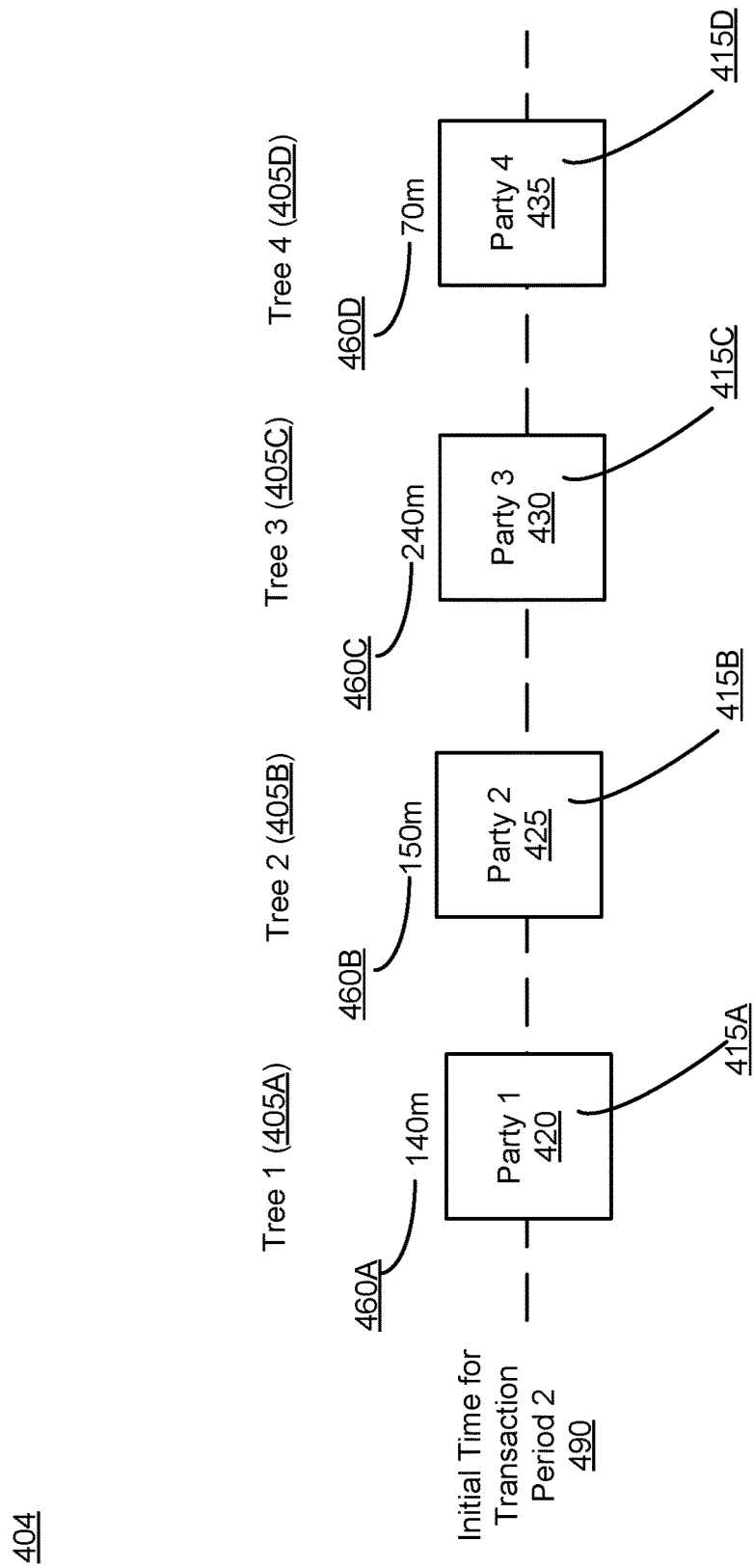
FIG. 4D depicts an initialization of asset positions held by various parties at the beginning of a transaction period, in accordance with an embodiment.

The embodiments depicted in FIG. 4B and FIG. 4C represent the interface 402 at the end of a transaction period (e.g., close of a trading day). Here, the directed graph module 305 accumulates the positions of the asset held by parties across the terminal nodes (e.g., shaded nodes in FIG. 4B or FIG. 4C) to obtain the accumulated position of the asset for each party. At the beginning of a new transaction period, the directed graph module 305 initializes the directed graphs by using the accumulated position of the asset for each party as the initial value of each directed graph (e.g., tree) for the new transaction period. In some embodiments, at the initiation of each new transaction period, the newly initialized directed graphs replace the previous directed graphs of the prior transaction period. FIG. 4D depicts an example display 404 of directed graphs at the beginning of a second transaction period. Here, the root nodes 415 correspond to the individual parties (e.g., party 1 (420), party 2 (425), party 3 (430), party 4 (435)). Additionally, the directed graph module 305 assigns each root node 415 the accumulated position 460 of the asset for each party from the prior transaction period.

In various embodiments, the directed graph module 305 can provide each interface (e.g., interface 400 in FIG. 4A, interface 402 in FIG. 4B or 4C, and interface 404 in FIG. 4D) for display. For example, the directed graph module 305 displays the interface 400, 402 or 404 including the multiple directed graphs to a user of the central service provider 150. Therefore, if a user of the central service provider 150 is reconciling transaction discrepancies, the user can view the interface 400, 402, or 404 and visually trace along each directed graph to identify the cause of the transaction discrepancy. In some embodiments, the directed graphs can be retrieved and automatically used by the central service provider 150 to reconcile discrepancies that may arise due to one or more transactions.

Managing Transactions

Transaction management module 310 receives transactions from a client device 110 that sends transaction requests specifying attributes of the transactions. Generally, the transaction management module 310 receives a first set of transactions within a time period such that the details of each transaction of the first set are written to a first block of the blockchain. The transaction management module 310 can further receive a second set of transactions in a next time period such that the details of each transaction of the second set are written to a next, adjacent block in the blockchain. By writing the details of each transaction as a block of the blockchain, the written details of each transaction are immutable, thereby protecting against unauthorized changes to the details of each transaction. The transaction management module 310 continues to repeat this process for subsequent sets of transactions received in subsequent time periods. In various embodiments, the time period for which transactions for a particular block are received can range between 30 seconds up to 30 minutes.

In each time period, the transaction management module 310 organizes the received transactions for that time period. For example, the transaction management module 310 can assign an order to the transactions such that the transactions are written in a block to the blockchain in their assigned order. In some embodiments, the transaction management module 310 orders the transactions based on a timestamp associated with each transaction. In one embodiment, the timestamp is assigned by the client device 110 that sent the transaction request. In another embodiment, the timestamp is assigned by the transaction management module 310 upon receipt of a transaction request. In some embodiments, the transaction management module 310 assigns the same timestamp to the received transactions that represents a timestamp for the block and then assigns an arbitrary order to the transactions.

The transaction management module 310 extracts relevant information from each transaction request. For example, the transaction management module 310 extracts the attributes of the transaction (e.g., asset type, a quantity of the asset, party that provided the transaction request, one or more parties involved in the transaction, conditions for the transaction to be executed) from the transaction request. The transaction management module 310 can use the extracted attributes to reflect the details of the executed transaction in a set of directed graphs initialized and maintained by the directed graph module 305. The set of directed graphs are specific for an asset type. Therefore, given an asset type extracted from the transaction request, the transaction management module 310 identifies the set of directed graphs that are specific for the asset type to effect the transaction. As another example, the transaction management module 310 uses the extracted information to identify the appropriate parties such that the transfer of assets between the parties can be reflected in the set of directed graphs.

Figure 4E:
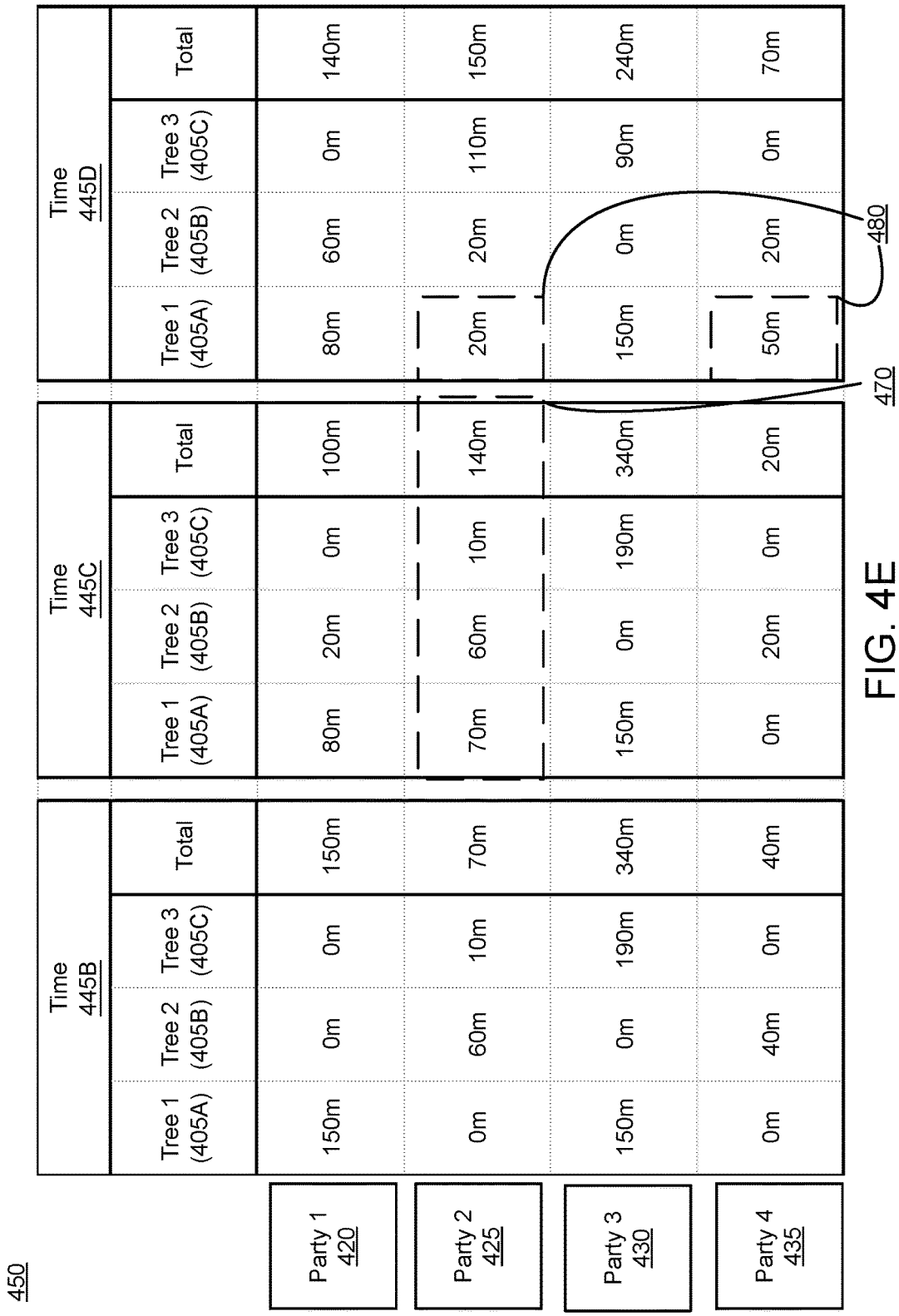
FIG. 4E is an example position table tabulating the positions of an asset held by different parties, in accordance with an embodiment.

The transaction management module 310 can further maintain a position table that is continuously updated for each executed transaction. The position table can be stored in the asset position store 340 and can serve as a ledger in maintaining the positions of an asset held by the various parties in the blockchain. Therefore, the transaction management module 310 can maintain multiple position tables, each position table specific for a type of asset. Reference is now made to FIG. 4E, which depicts an example position table 450 that documents the positions of an asset held by different parties, in accordance with an embodiment. Generally, the position table 450 depicts the total quantity of an asset held by each party (e.g., party 1 (420), party 2 (425), party 3 (430), party 4 (435)). In some embodiments, the position table 450 in FIG. 4E depicts the positions of the asset held by the parties at different time 445 during the transaction period. In other words, the position table 450 provides a snapshot of the quantity of an asset held by each party during various times 445 of the transaction period (e.g., during the trading day). In some embodiments, the position table 450 only maintains the positions of the asset held by the parties at a current time. For example, if the current time corresponds to time 445D, then the positions of the asset held by the parties at time 445B and time 445C can be discarded or replaced. In various embodiments such as the one shown in FIG. 4E, the position table 450 may further breakdown a total quantity of the asset held by each party into the position of the asset held by each party in each directed graph (e.g., tree 405). Thus, the position table 450 further enables a rapid understanding of the quantity of assets across directed graphs such that subsequent transactions can be represented using an appropriate tree 405.

In executing a transaction, the transaction management module 310 uses the directed graphs (as depicted in FIGS. 4A-4D) and the position table 450 (as depicted in FIG. 4E). Given the extracted information for a transaction (e.g., the involved parties, the asset type, quantity of asset, and the like), the transaction management module 310 queries the position table 450 to identify the appropriate directed graphs that will be used to represent the executed transaction. For example, referring to the position table 450 shown in FIG. 4E, the position table 450 tabulates the position of the asset held by each party in each tree 405 (e.g., directed graph) at different times 445. Therefore, the transaction management module 310 identifies the parties in the position table 450 that are involved in the transaction and verifies that the party providing the asset possesses a sufficient total quantity of the asset for the transfer. The transaction management module 310 identifies one or more trees 405 in the position table 450 that possess a sufficient quantity of the asset to represent the executed transaction. In various embodiments, if each directed graph denotes a position of the asset held by the party that is insufficient to represent the executed transaction, the transaction management module 310 can represent the transaction using more than one directed graph, provided that the overall quantity of the asset held by the party is sufficient. In some embodiments, the transaction management module 310 identifies one or more directed graphs by tracing the transaction records in the blockchain. For example, the transaction management module 310 can maintain the position of the asset held by the party as it traces along the transaction records in the blockchain to determine that the party holds a sufficient quantity of the asset to execute the transaction.

As a specific example, referring to the directed graph interface shown in FIG. 4B and the position table 450 shown in FIG. 4E, at time 445C, the transaction management module 310 receives a transaction request specifying a transfer of 50 m of the asset from party 2 (425) to party 4 (435). Therefore, the transaction management module 310 queries the position table 450 for the row 470 corresponding to the position of the asset held by party 2 (425) at time 445C. Given that the total quantity of the asset held by party 2 (425) (e.g., 140 m) is sufficient to execute the transaction, the transaction management module 310 identifies the appropriate directed graph to perform the transaction. Here, the transaction management module 310 determines that both tree 1 (405A) and tree 2 (405B) indicate a sufficient position of the asset held by party 2 (425) to effect the transfer of 50 m of the asset to party 4 (435). Tree 3 (405C) indicates an insufficient position of the asset held by party 2 (425). Therefore, the transaction management module 310 selects one of the trees that indicate a sufficient position (e.g., tree 1 (405A)) and executes the transaction. Referring now to FIG. 4B, the transaction management module 310 generates the nodes and edges (as indicated by 475) that reflect the transaction. Specifically, the transaction management module 310 generates a node representing party 4 (435) at time 445D as well as a first edge indicating the transfer of 50 m of the asset from party 2 (425) to party 4 (435). Additionally, the transaction management module 310 generates a node representing party 2 (425) at time 445D and a second edge indicating the retention of 20 m of the asset by party 2 (425).

The transaction management module 310 further updates the position table 450 to reflect the executed transaction. Referring to FIG. 4E, the transaction management module 310 determines the updated position of the asset held by party 2 (425) in tree 1 (405A) as well as the updated position of the asset held by party 4 (435) in tree 1 (405A) at the current time 445D and generates entries 480 that reflect the updated position (e.g., 20 m and 50 m). Therefore, the position table 450 contains the up-to-date positions of each party across the different trees 405 at the current time 445D.

Generating Cryptographically Strong Blocks of Transaction Records

Figure 5A:
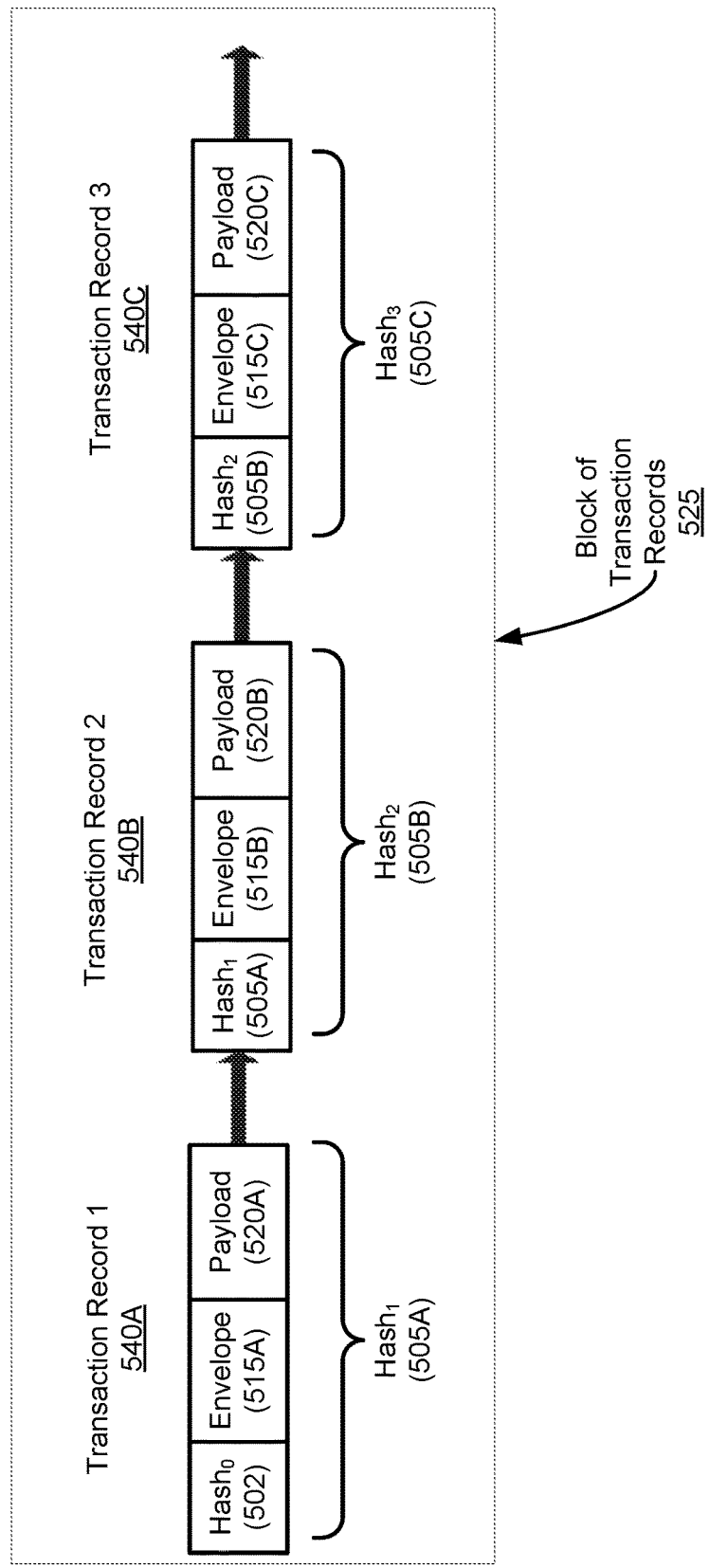
FIG. 5A depicts examples of transaction records generated by the central service provider, in accordance with an embodiment.

The transaction record module 315 generates transaction records that correspond to the executed transactions. Each transaction record includes details of the executed transaction as well as information pertaining to a prior transaction. FIG. 5A depicts examples of transaction records 540 generated by the transaction record module 315, in accordance with an embodiment. The transaction record module 315 generates transaction records 540 that each incorporates a payload 520 that includes the details, such as the attributes, of the transaction. In the embodiment shown in FIG. 5A, a transaction record 540 includes components such as a hash (502, 505A, or 505B) and an envelope 515 in addition to the payload 520.

The hash value (502, 505A, or 505B) is a hash of a prior transaction record 540. The hash value serves as a transaction identifier. Referring to FIG. 5A, hash$_1$ (505A), which is included as a part of transaction record 2 (540B), is the hash value representing transaction record 1 (540A). Hash$_2$ (505B), which is included as a part of transaction record 3

(540C), is the hash value representing transaction record 2 (540B). Similarly, $hash_0$ (502) of transaction record 1 (540A) is the hash value of the immediately preceding transaction record (not shown). In various embodiments, the hash value (502, 505A, or 505B) of a transaction record 540 is generated using one of a message digest algorithm 5 (MD5), a secure hash algorithm (SHA) algorithm (e.g., SHA-0, SHA-1, SHA-2, or SHA-3), BLAKE, or other hash functions of the like. As a particular example, the hash (502, 505A, or 505B) of a transaction record 540 is a SHA256 hash.

In some embodiments, each hash value (502, 505A, or 505B) corresponds to an immediately previous transaction that was received in a time period. As one example, the order of the transaction records 540 is based on the assigned order of the received transactions, as described above in relation to the transaction management module 310. In some embodiments, each hash value (502, 505A, or 505B) corresponds to an immediately previous transaction in a transaction request from a party. In other words, each hash value (502, 505A, or 505B) represents the immediately prior transaction record of a transaction sent by the party. Thus, a chain of transaction records 540 can be created that is specific for the party of the blockchain.

Each envelope 515 includes various details associated with the corresponding payload 520. For example, the envelope 515 can include a digital signature that was generated using the private key of the central service provider 150. This acts as a cryptographic guarantee that the transaction record 540 was written in a block to the blockchain. In various embodiments, the envelope 515 can include information corresponding to further processing of the payload 520. For example, the payload 520 in a transaction record 540 may be encrypted using either symmetric or asymmetric cryptographic techniques. Therefore, the envelope 515 can include information (e.g., a signature of the appropriate key that encrypted the payload) such that a device can identify and appropriately decrypt the encrypted payload. As another example, the envelope 515 can further include information such as a block identifier that identifies the block that the transaction record 540 is included within or a transaction record position identifier that identifies the location of the transaction record 540 within the block. In some embodiments, the envelope further includes a directed graph identifier that identifies the one or more directed graphs that were used to represent the transaction. The envelope can further include node identifiers and edge identifiers that identify the one or more nodes and edges of the one or more directed graphs that were generated to effect the transaction corresponding to the transaction record. Therefore, if the transaction needs to be reconciled, the information in the envelope 515 of the corresponding transaction record 540 such as the directed graph identifier, the node identifier, and/or the edge identifier can be used to identify the directed graph, nodes, and edges, respectively, to reconcile the transaction in the directed graph.

The payload 520 of a transaction record 540 includes details of an executed transaction. For example, details of a transaction can include the attributes of a transaction, which was described above as including an identification of a first party, an identification of a second party, the asset type, the quantity of asset to be transferred, the conditions of the transaction, and a timestamp of the transaction.

In various embodiments, the attributes of the received transaction included in the payload 520 are encrypted. For example, the encrypted payload 520 can be generated by performing symmetric or asymmetric cryptography techniques. For symmetric cryptography, the transaction record module 315 can generate a symmetric key and encrypt the payload using the symmetric key. For asymmetric cryptography, the transaction record module 315 retrieves a public key of a party of the blockchain that will subsequently receive the transaction record and encrypts the payload using the public key.

The block generation module 320 maintains a blockchain network for the central service provider 150 and generates new blocks of transaction records 525 that can be appended to the blockchain network. Each block of the blockchain contains a reference of a prior block of the blockchain, thereby ensuring that the blocks of transaction records 525 are immutable in the blockchain. For example, a reference may be a hash value representing the immediately prior block of the blockchain. Therefore, if any detail of a transaction record 540 or a block of transaction records 525 is changed, then the block of transaction records 525 is invalidated.

In various embodiments, each block of transaction records 525 includes details of transactions corresponding to transaction requests that were received by the central service provider 150 during a time period. In some embodiments, each block of transaction records 525 includes details of a threshold number of transactions. In some embodiments, each block of transaction records 525 includes details of transactions that, in totality, specify up to a threshold amount of an asset. In other embodiments, any combination of a threshold number of transactions, transaction requests received during a time period, and threshold amount of an asset are used to limit the size of the block of transaction records 525. The blocks of the blockchain can be stored in the blockchain store 335.

The block generation module 320 generates a block of transaction records 525 that includes the multiple transaction records 540 that were generated by the transaction record module 315. Referring again to FIG. 5A, the multiple transaction records 540 are immutably linked by the hash value (502, 505A, or 505B) in each transaction record 540. In various embodiments, the block generation module 320 sequentially appends each transaction record 540 to the block to generate the final block of transaction records 525 for a time period.

In some embodiments, the block of transaction records 525 includes all transaction records 540 of transactions that were received for a time period. For example, transaction records 540 of all received transactions associated with timestamps that are within the time period are included in the block of transaction records 525. In another embodiment, the block generation module 320 generates multiple blocks of transaction records 525 for a time period. Each block of transaction records 525 can be specific for a party of the blockchain. Specifically, each block of transaction records 525 corresponds to transactions that were sent by a client device 110 associated with a party of the blockchain.

Figure 5B:
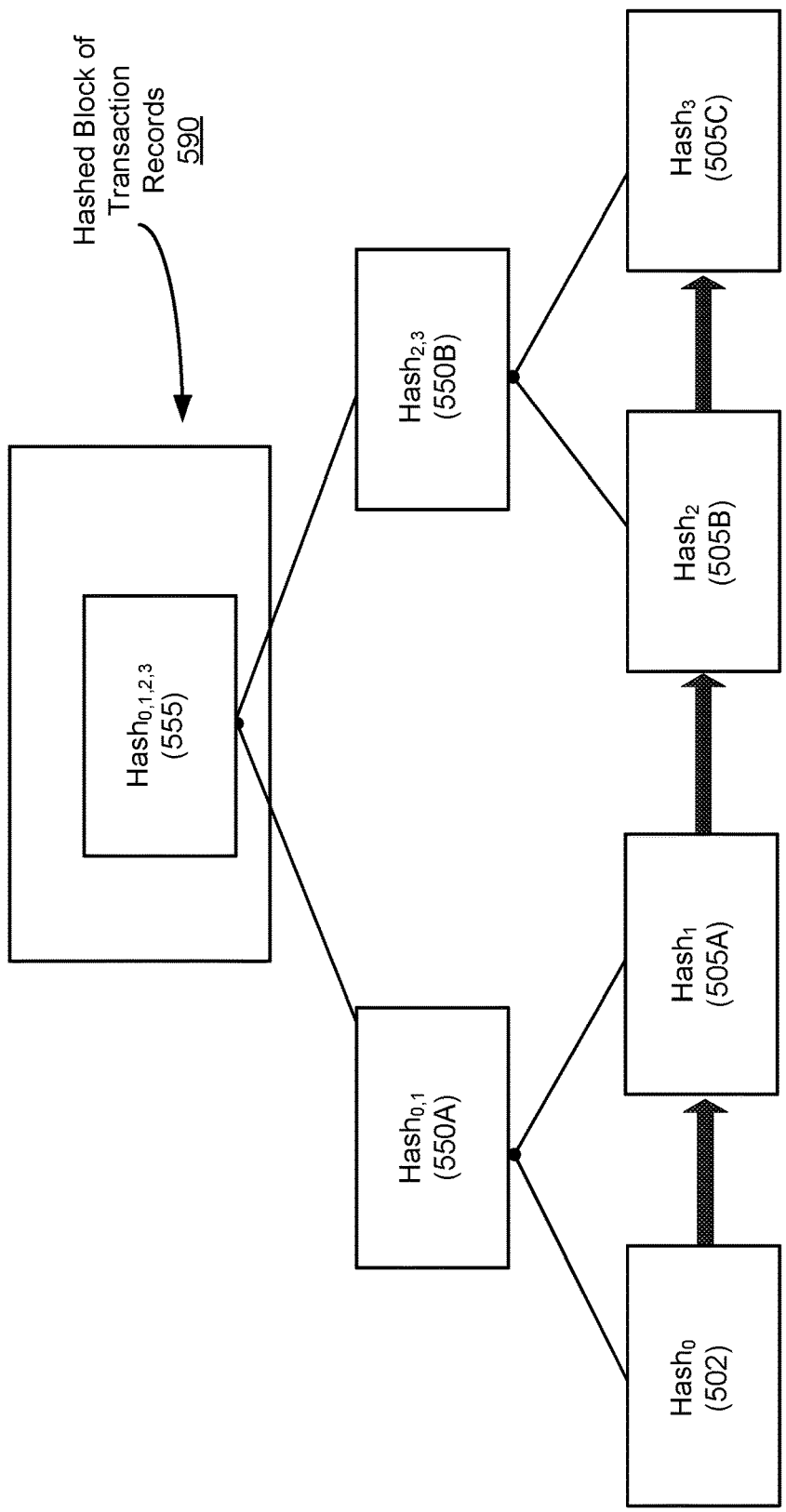
FIG. 5B illustrates an example hashing strategy for generating a hashed block of transactions, in accordance with an embodiment.

In various embodiments, the block of transaction records 525 can be further processed by the block generation module 320. As an example, the block of transaction records 525 can be further hashed by the block generation module 320 to reduce computational resources that are needed to verify transactions. Reference is now made to FIG. 5B, which illustrates an example hashing strategy for generating a hashed block of transaction records 590. Specifically, the block of transaction records 525 (see FIG. 4) can be hashed using a binary hash tree (e.g., a Merkle tree) to generate the hashed block of transaction records 590.

As depicted in the embodiment shown in FIG. 5B, the block generation module 320 can perform a pairwise hashing of pairs of transaction records 540, each of which is represented as one of $hash_0$ 502, $hash_1$ 505A, $hash_2$ 505B, or $hash_3$ 505C. Specifically, $hash_0$ 502 and $hash_1$ 505A are hashed together as a pair using any of the aforementioned hashing algorithms (e.g., MD5, SHA-0, SHA-1, SHA-2, SHA-3, BLAKE, and the like) to generate $hash_{0,1}$ 550A. Similarly, $hash_2$ 505B and $hash_3$ 505C are hashed together to generate $hash_{2,3}$ 550B. Then, $hash_{0,1}$ 550A and $hash_{2,3}$ 550B can undergo a pairwise hashing to generate a root of the hash tree, represented as $hash_{0,1,2,3}$ 555. As depicted in FIG. 5B, the root of the hash tree represents a hashed block of transaction records 590 that encompasses all transactions in the block.

In various embodiments, the block generation module 320 writes the hashed block of transaction records 590 as a block on the blockchain (e.g., store the hashed block of transaction records 590 in blockchain store 335). Storing the hashed block of transaction records 590 can be more efficient for data verification purposes. For example, a central service provider 150 can transmit the hashed block of transaction records 590 to a client device 110 for verification of all transaction records in the block without transmitting individual transaction records.

Transmitting Cryptographic Transactions for Verification

The transaction receipt module 325 generates a transaction receipt reflecting the executed transactions and/or blocks of executed transactions. The transaction receipt module 325 transmits a transaction receipt to a client device 110 that originally sent the transaction request such that the client device 110 can verify that the transaction in the request was appropriately executed.

The transaction receipt module 325 generates a transaction receipt for one or more transactions executed. Therefore, the client device 110 can verify each executed transaction using the transaction receipt. Although the subsequent description may refer to a transaction receipt that includes information pertaining to a single transaction, the subsequent description may be applied to multiple transactions in the transaction receipt.

In various embodiments, the transaction receipt includes one or more attributes of the transaction specified by the transaction request sent by the client device 110 including a unique transaction request identifier as well as an asset type, a quantity of the asset to be transferred, a price of the asset, one or more parties involved in the transfer, conditions of the transaction, and a timestamp of the transaction. In particular embodiments, the transaction receipt includes the unique transaction request identifier such that the client device 110 can identify that the transaction receipt corresponds to the previously placed transaction.

In various embodiments, the transaction receipt generated by the transaction receipt module 325 further includes a hash value representing the block of transactions in which the transaction was included within. For example, referring to FIG. 5B, the hash value included in the transaction receipt can be the root hash (e.g., $hash_{0,1,2,3}$ 555) of the Merkle tree that encompasses all transactions in the block. In various embodiments, the transaction receipt module 325 further includes hash values representing previous transactions in the block. For example, referring to FIG. 5A, the block of transaction records 525 may solely include transaction records 540 corresponding to transactions included in transaction requests placed by the client device 110. If transaction record 3 (540C) corresponds to the most recently received transaction request sent by client device 110, then the transaction receipt module 325 includes the hash values of $hash_0$ (502), $hash_1$ (505A), and $hash_2$ (505B) that each represent a prior transaction record 540 in the block. In various embodiments, the transaction receipt further includes a timestamp applied by the transaction receipt module 325. In some embodiments, the transaction receipt includes a hash value representing the transaction receipt (e.g., transaction receipt hash). As an example, the transaction receipt hash is a hash of each of the aforementioned items in the transaction receipt. Specifically, the transaction receipt hash is a hash of 1) the unique transaction request identifier, 2) the hash value representing the block of transactions that the transaction was included within, 3) hash values representing previous transactions in the block, and 4) the timestamp. In various embodiments, more or fewer elements are hashed to obtain the transaction receipt hash. For example, the timestamp may not be included in the transaction receipt hash. The transaction receipt hash may be generated by any of the aforementioned hash strategies (e.g., MD5, SHA-0, SHA-1, SHA-2, SHA-3, BLAKE, and the like).

In some embodiments, the transaction receipt also includes the updated position of the asset held by the party associated with the client device 110 following the executed transaction. For example, if the client device 110 sent a transaction request that specified a transfer of assets, then the transaction receipt can include the updated position of the asset (e.g., either the overall position or one or more positions across the directed graphs) held by the party taking into consideration the specified transfer of assets. The transaction receipt module 325 can obtain the updated position from the position table 450.

In particular embodiments, the transaction receipt module 325 generates and transmits a transaction receipt to the client device 110 where the transaction receipt includes the elements of 1) the unique transaction request identifier, 2) the hash value representing the block of transactions that the placed transaction was included within, 3) hash values representing previous transactions in the block, 4) the timestamp, 5) the transaction receipt hash, and 6) the updated position of the asset held by the party. In various embodiments, the transaction receipt need not include these elements in the particular order denoted here. In various embodiments, the transaction receipt includes fewer or additional elements than specified here.

The transaction receipt module 325 transmits the transaction receipt to the client device 110. In some embodiments, the transaction receipt only includes information for one transaction, and therefore, the transaction receipt module 325 transmits the transaction receipt following the execution of the transaction. Therefore, the client device 110 can verify each executed transaction in real-time. In some embodiments, the transaction receipt module 325 transmits transaction receipts at specific time intervals, such as time periods corresponding to blocks of transactions or at the ends of transaction periods (e.g., end of each trading day).

Reconciling Transactions

Reconciliation module 330 identifies a discrepancy and reconciles the discrepancy. Examples of a discrepancy include 1) a discrepancy in a position of the asset held by a party or 2) a discrepancy of a hash value (e.g., hash of a block or a hash of a transaction record). In particular, a discrepancy of a hash value may arise from a missing transaction, an added transaction, or a wrongly processed transaction. In various embodiments, the reconciliation module 330 receives a notification from the client device 110 that indicates a discrepancy. In some embodiments, the reconciliation module 330 identifies the discrepancy from transaction data received from the primary recordation system 120. The reconciliation module 330 performs the reconciliation process to resolve the discrepancy.

In various embodiments, to reconcile a discrepancy, the reconciliation module 330 retrieves the position table 450 from the asset position store 340 and queries the position table 450. Referring to FIG. 4E, the reconciliation module 330 can identify the appropriate time 445 based on a timestamp included in the notification. Therefore, the reconciliation module 330 can identify the appropriate entry in the position table 450 that corresponds to the identified discrepancy. Referring to FIG. 4E, as one example, the identified discrepancy may refer to an overall balance of the asset held by party 2 (425) at time 445C. Therefore, the reconciliation module 330 can identify row 470 that depicts the position of the asset held by the party in each tree 405 as well as the overall position of the asset held by the party. In some embodiments, the reconciliation module 330 reconciles the discrepancy by adjusting the position of the asset held by the party as specified in the identified row 470 of the position table 450.

In various embodiments, to reconcile the discrepancy, the reconciliation module 330 retrieves the one or more directed graphs (e.g., the trees 405 in FIG. 4B) and identifies the nodes and/or edges of each directed graph that correspond to the timestamp included in the notification. For example, the discrepancy may indicate a transaction record that is written in a block of the blockchain. The reconciliation module 330 identifies the transaction record and extracts identifiers from the transaction record that refer to one or more directed graphs, nodes, or edges. For example, as described above, the transaction record may include an envelope that stores one or more of a directed graph identifier, node identifier, and edge identifier. The reconciliation module 330 identifies the appropriate directed graph that represents the executed transaction corresponding to the transaction record using the directed graph identifier. In some scenarios, the reconciliation module 330 can use either the node identifier or edge identifier to identify the appropriate directed graph. Similarly, the reconciliation module 330 identifies the appropriate node in the directed graph and/or the appropriate edge in the directed graph using the node identifier and edge identifier, respectively.

The reconciliation module 330 can trace backwards along each directed graph, beginning at the node and/or edge identified by the node identifier and/or edge identifier to identify suspect nodes and/or edges that correspond to particular transaction(s) that caused the discrepancy. In various embodiments, the reconciliation module 330 can trace the entire lineage of the asset beginning at a terminal node of the identified directed graph back to the root node 415 (see FIG. 4B) of the identified directed graph to verify that no further discrepancies exist. In some embodiments, the reconciliation module 330 updates the suspect nodes and/or edges to resolve the discrepancy. For example, if a discrepancy is identified in the overall position of an asset held by a party, the reconciliation module 330 identifies the suspect nodes and edges that the discrepancy arises from. The reconciliation module 330 updates the suspect nodes and edges (e.g., change values of asset assigned to each node/edge) to resolve the discrepancy. If the notification specifies a discrepancy involving a mismatched hash value, the reconciliation module 330 can further add new nodes/edges or remove existing nodes/edges from the directed graphs to resolve the discrepancy.

In various embodiments, the reconciliation module 330 updates the transaction record 540 (see FIG. 5A) corresponding to the transaction(s) that caused the discrepancy in the overall position of the asset held by the one or more parties. The reconciliation module 330 identifies and regenerates the transaction record 540 to reconcile the discrepancy. For example, the reconciliation module 330 generates a new payload 520 that includes the correct values of the transaction and rehashes the elements of the transaction record 540. Alternatively or additionally, the reconciliation module 330 generates a new transaction record 540 or removes an existing transaction record 540 to reconcile a missing transaction or extra transaction, respectively. In various embodiments, the reconciliation module 330 regenerates each subsequent transaction record 540 in the block of transaction records 525 and transaction records 540 in subsequent blocks of transactions to reflect the reconciliation.

Process of Managing Transactions

Figure 6A:
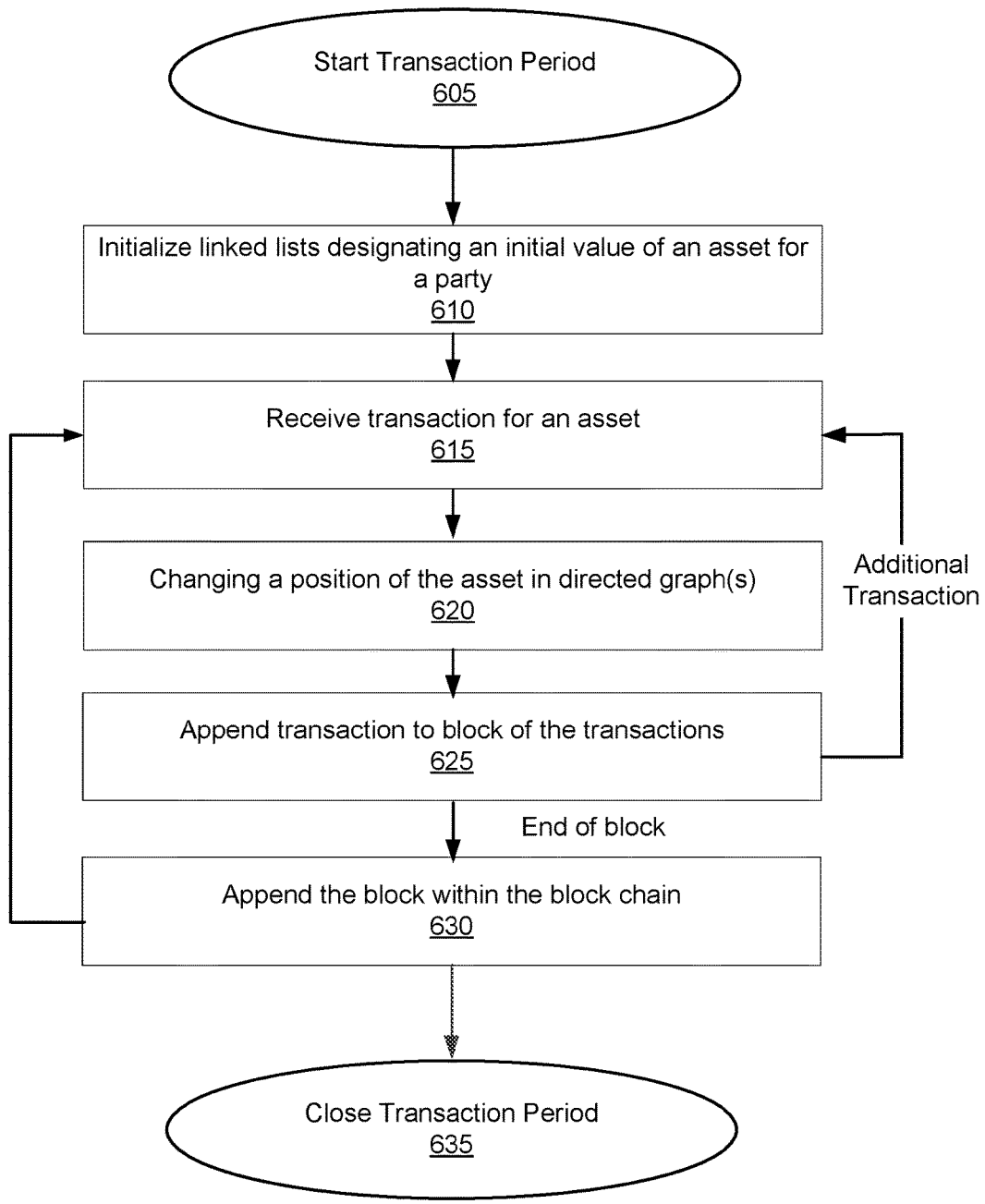
FIG. 6A is a flow diagram process for managing verifiable, cryptographically strong transactions, in accordance with an embodiment.

FIG. 6A is a flow diagram process 600 for managing verifiable, cryptographically strong transactions, in accordance with an embodiment. A transaction period, such as a new trading day, is started 605. The central service provider 150 initializes 610 directed graphs that each designate an initial value of an asset for a party of the blockchain. The central service provider 150 receives 615 a transaction for an asset for a time period. The central service provider 150 changes 620 a position of the asset held in one or more directed graphs to reflect the executed transaction.

The central service provider 150 appends 625 the details of the executed transaction to a block of transactions for the time period. In other words, the central service provider 150 generates and appends a transaction record of the executed transaction to a block of transaction records. In some scenarios, the central service provider 150 can receive additional transactions during the same time period and therefore, executes 620 and appends 625 the additional transactions to the block of transactions. When the central service provider 150 processes all transactions for the time period, the central service provider 150 appends 630 the block of transactions to the blockchain. The block of transactions includes a hash value that represents a hash of a prior block identifier. This enables the immutability of transactions in each block.

At the beginning of a new time period, the central service provider 150 can receive 615 new transactions for the new time period and repeats steps 615, 620, 625, and 630. At the end of a transaction period (e.g., trading day), the central service provider 150 closes 635 the transactions of the transaction period.

Figure 6B:
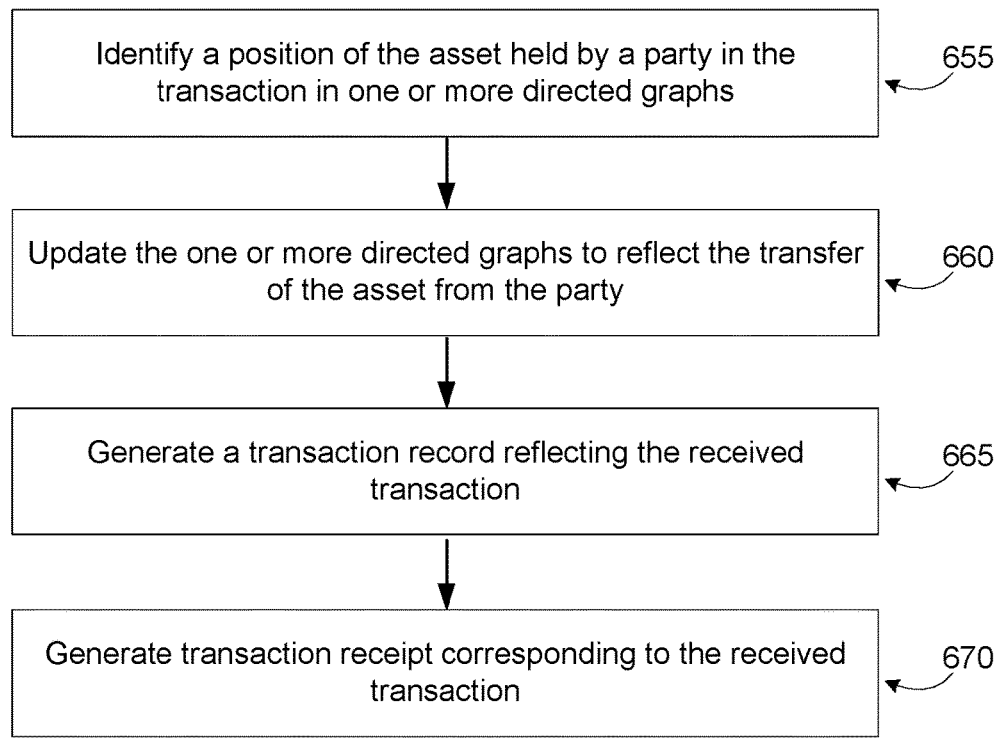
FIG. 6B is a flow diagram process of executing transactions by the central service provider, in accordance with an embodiment.

Reference is now made to FIG. 6B, which is a flow diagram process of executing transactions, in accordance with an embodiment. Specifically, the flow diagram process of FIG. 6B further details step 620 of FIG. 6A. The central service provider 150 identifies 655 a position of the asset held by a party in the transaction within one or more directed graphs. In one embodiment, the central service provider 150 queries a position table maintained by the central service provider 150 to determine the position of the asset within one or more directed graphs. The central service provider 150 updates 660 the one or more directed graphs to reflect the transfer of the asset from the party. For example, the central service provider 150 generates nodes and edges in the one or more directed graphs that depict the transfer and retention of an asset by a different party and the party, respectively. The central service provider 150 generates 665 a transaction record including the details of the additional transaction as well as a hash value that represents a prior transaction record. Additionally, the central service provider 150 generates 670 a transaction receipt corresponding to the received transaction. In various embodiments, the transaction receipt can be sent to the client device 110 that sent a transaction request, thereby enabling the client device 110 to verify that the transaction was appropriately executed.

Optionally, the central service provider 150 can further reconcile one or more transactions represented by transaction records in the generated block. In various embodiments, the central service provider 150 can perform the reconciliation process for a transaction in a block at any time (e.g., even if in a different time period or even different transaction period). In some embodiments, the central service provider 150 performs the reconciliation process in response to receiving a request from a client device 110 which verifies whether details of executed transactions were appropriately written to the blockchain. The process of verifying the details of executed transactions by the client device 110 is described below in further detail.

Verifying Recorded Transactions

Verification of Transactions Placed by Client Device

Figure 7A:
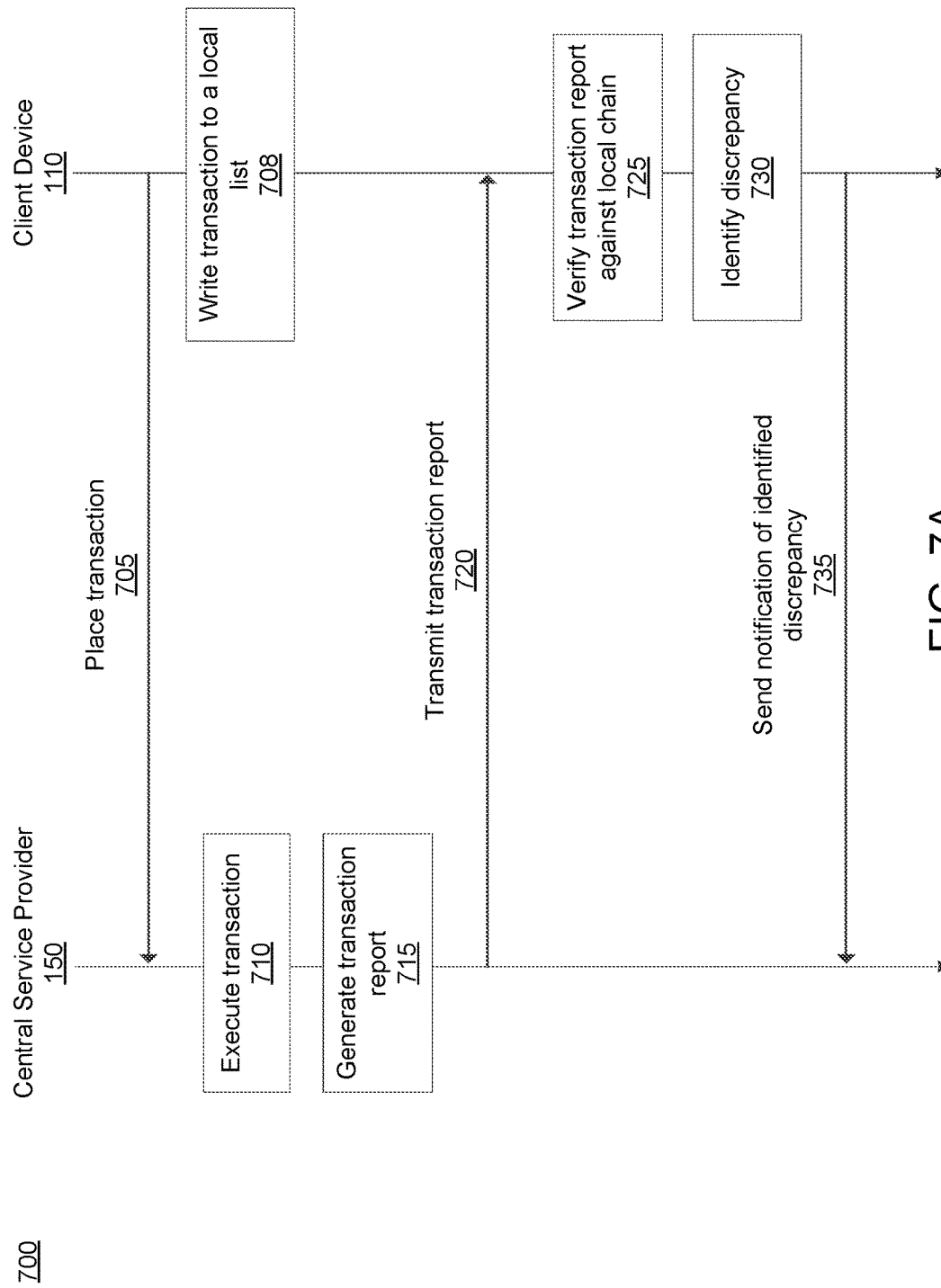
FIG. 7A is an interaction diagram for verifying executed transactions by a client device, in accordance with an embodiment.

FIG. 7A is an interaction diagram 700 for verifying executed transactions by a client device 110, in accordance with an embodiment. A client device 110 can send 705 a transaction request and write 708 the details of a transaction to a local list that is stored in the transaction store 215A (see FIG. 2A). The central service provider 150 executes 710 the transaction, generates 715 and transmits 720 the transaction receipt to the client device 110. Referring again to FIG. 2A, the client device 110, or more specifically, the verification module 210A of the client device 110 verifies 725 the transaction receipt transmitted by the central service provider 150 and identifies 730 discrepancies in the one or more executed transactions in the transaction receipt.

Referring more specifically to the verification step (step 725), in various embodiments, the transaction receipt received by the verification module 210A includes, for each executed transaction, the elements of 1) the unique transaction request identifier, 2) the hash value representing the block of transactions that the placed transaction was included within, 3) hash values representing previous transactions in the block, 4) the timestamp, 5) the transaction receipt hash, and 6) the updated position of the asset held by the party. Generally, the transaction receipt received by the client device 110 enables the client device 110 to verify that 1) the quantity of assets involved in each transaction is correct and 2) no missing or extra transactions were executed.

Figure 7B:
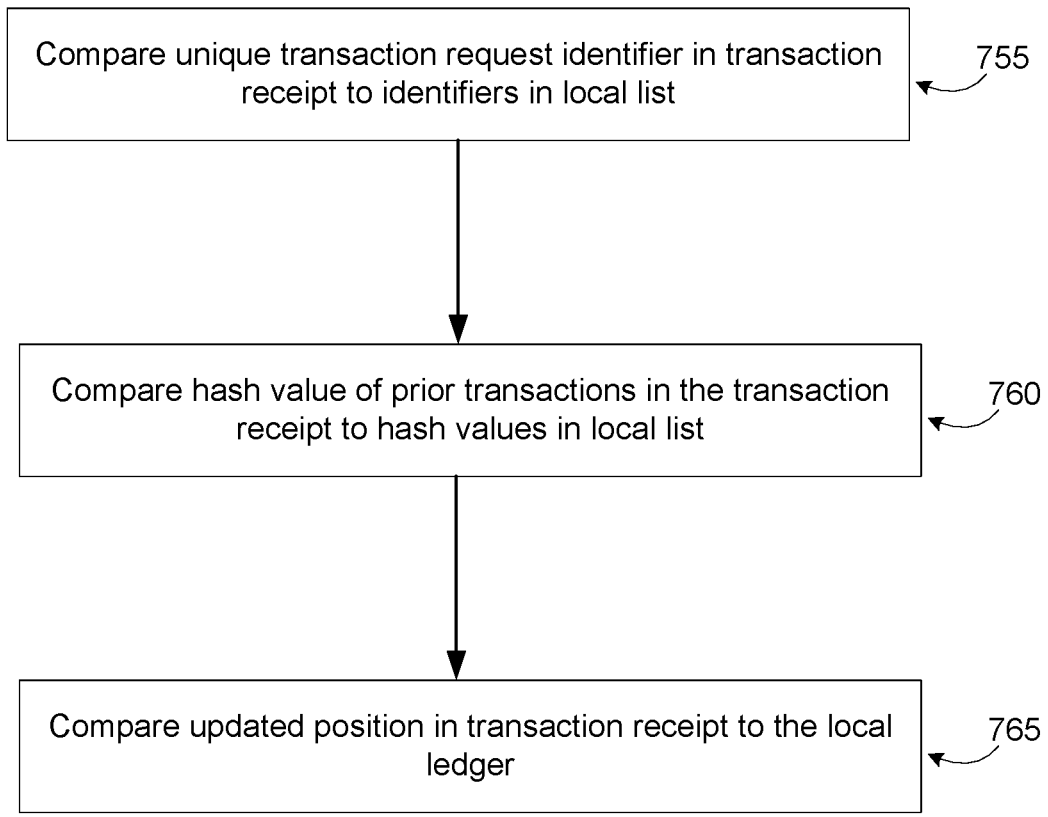
FIG. 7B is an example flow process for verifying a transaction receipt by a client device, in accordance with an embodiment.

Referring to FIG. 7B, it depicts an example flow process for verifying a transaction receipt by a client device, in accordance with an embodiment. Although FIG. 7B depicts steps 755, 760, and 765 as a flow process, in various embodiments, the verification module 210A can perform the steps in any order. In some embodiments, the verification module 210A performs additional or fewer steps than those shown in FIG. 7B in verifying a transaction receipt.

For each executed transaction in the transaction receipt, the verification module 210A compares 755 the unique transaction request identifier in the received transaction receipt to the locally stored list in the transaction store 215A. Specifically, the verification module 210A matches the unique transaction request identifier in the received transaction receipt to the same unique transaction request identifier in the list. This serves as confirmation to the verification module 210A that the transaction request was received and the transaction was executed by the central service provider 150. In some embodiments, the verification module 210A detects a discrepancy between the unique transaction request identifiers in the transaction receipt and the unique transaction request identifiers in the locally stored list. For example, one or more transaction requests sent by the transaction placement module 205 may not have been executed, thereby resulting in a missing unique transaction request identifier in the transaction receipt. As another example, an extra transaction may have been executed, thereby resulting in an extra unique transaction request identifier in the transaction receipt. As a third example, a transaction of a transaction request may have been incorrectly executed, thereby resulting in a mismatch between unique transaction request identifiers of the transaction receipt and the list.

In some embodiments, the verification module 210A can compare 760 the hash values representing previous transactions in the block (element 3 of the transaction receipt) to hash values of a local transactions stored in transaction store 215A. In other words, the verification module 210A can compare all prior transaction requests sent by the transaction placement module 205 in the local ledger to the transactions identified by the hash values corresponding to all prior transactions from the client device 110 in the transaction receipt. In some embodiments, the verification module 210A compares the hash value representing the block of transactions that the transaction was included within (element 2 of the transaction receipt) to a hash value stored in transaction store 215A. For example, the hash value representing the block of transactions may be a hash value of the root of a binary hash tree. Therefore, verifying this single hash value ensures that all transactions in the block of transactions represented by the single hash value are valid and correct.

In some embodiments, the verification module 210A compares 765 the updated position of the asset held by the party indicated by the transaction receipt to the local ledger locally stored in the asset position store 220A to verify the received transaction receipt. For example, the verification module 210A ensures that the position of asset held by the party included in the transaction receipt (element 6 of the transaction receipt) matches the position of the asset held by the party in the locally stored ledger. This serves as confirmation to the verification module 210A that the quantity of an asset held by the party associated with the client device 110 is consistent across the client device 110 and the central service provider 150.

The verification module 210A sends 735 a notification to central service provider 150 including information corresponding to an identified discrepancy. In various embodiments, the verification module 210A can also send a notification to the primary recordation system 120 to reconcile the discrepancy. The information of the identified discrepancy includes information corresponding to a suspected transaction that was identified to have caused the discrepancy. In some embodiments, information of the suspected transaction can include a hash value representing the block of transactions that the transaction was included within (element 2 of the transaction receipt) and the timestamp of the transaction within the transaction receipt (see element 4).

Verification of Transactions of a Primary Recordation System

Figure 8A:
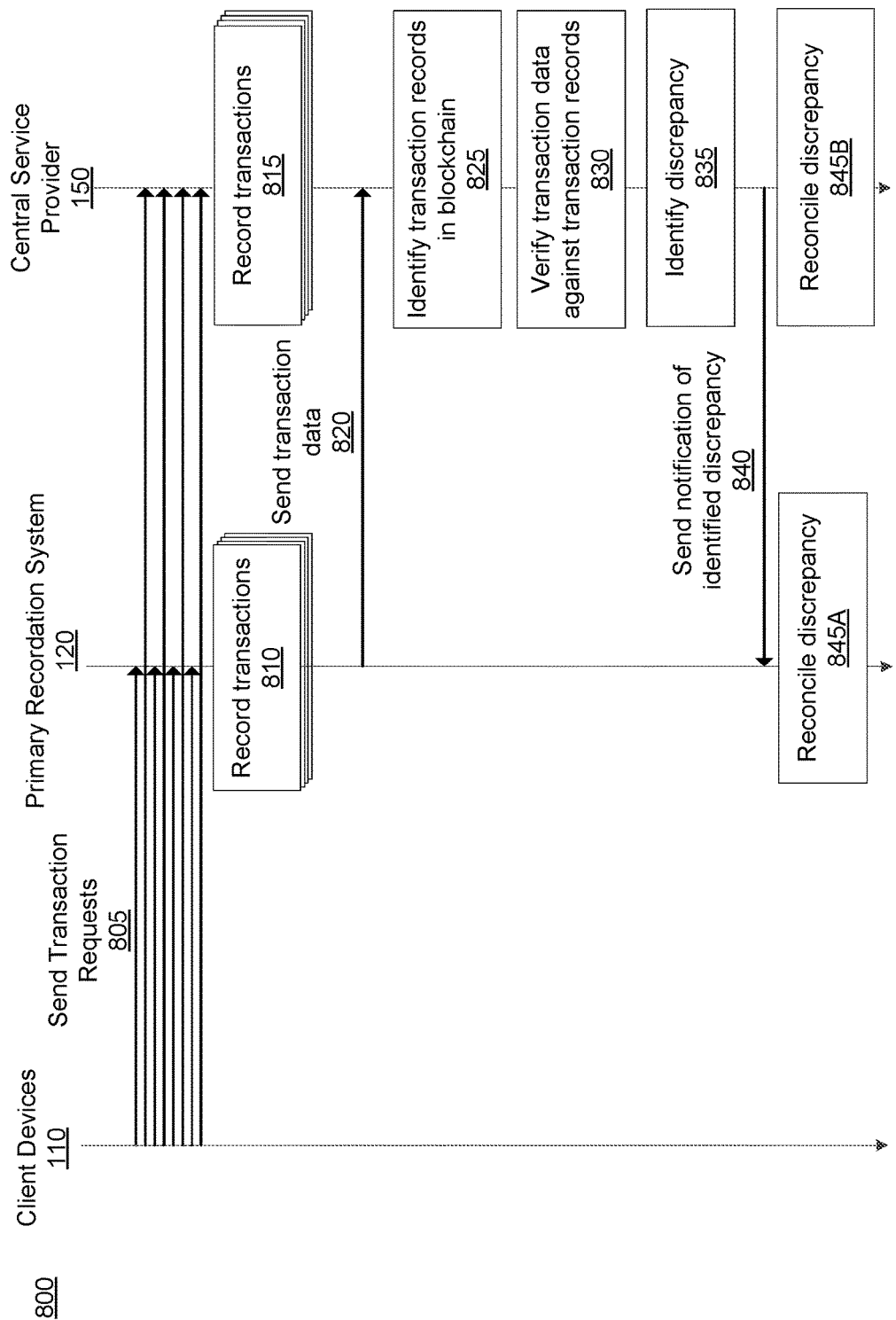
FIG. 8A is an interaction diagram for verifying transactions recorded by a primary recordation system, in accordance with an embodiment.
Figure 8B:
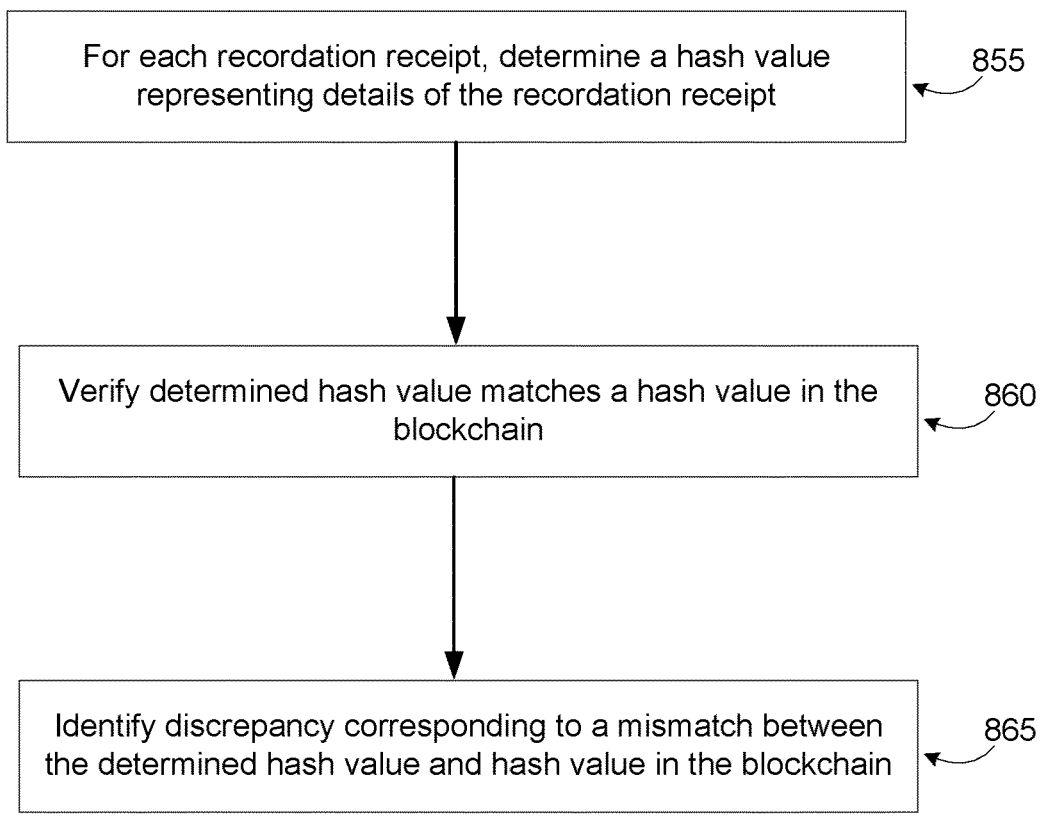
FIG. 8B is an example flow process for verifying a transaction recorded by a primary recordation system, in accordance with an embodiment.

FIG. 8A is an interaction diagram 800 for verifying transactions recorded by a primary recordation system 120, in accordance with an embodiment. One or more client devices 110 may send 805 transaction requests for a set of transactions, each transaction specifying a transfer of an asset. In various embodiments, the client devices 110 sends transaction requests to both the primary recordation system 120 and the central service provider 150. In other embodiments, the primary recordation system 120, or more specifically the transaction handling module 208 as shown in FIG. 2B, receives the transaction requests and forwards a copy of the transaction requests for the central service provider 150. Therefore, both the central service provider 150 and the primary recordation system 120 receive the same transaction requests from client devices 110.

Both the central service provider 150 and the primary recordation system 120 record 810 and 815 the transaction requests. Specifically, referring to FIG. 2B, the primary recordation system 120 may maintain a local store of transactions (e.g., transaction store 215B) and a local store of positions held by various parties (e.g., asset position store 220B). The transaction handling module 208 of the primary recordation system 120 can record 810 the received transactions using the local store of transactions and local store of positions. In various embodiments, the primary recordation system 120 records 810 the received transaction requests by 1) updating the position table in the transaction store 215B and 2) storing transaction data for a transaction corresponding to the received transaction request in the transaction store 215B.

The transaction handling module 208 updates the position table in the asset position store 220B to reflect each transaction. For example, the transaction handling module 208 increases a position of an asset held by a party receiving the asset and decreases a position of the asset held by a party sending the asset. Therefore, the transaction handling module 208 maintains the up-to-date positions of an asset held by each party. Additionally, the transaction handling module 208 stores transaction data for the transaction in the transaction store 215B. As an example, the transaction data for a transaction includes attributes of the transaction (e.g., asset type, quantity of the asset, parties involved in transaction, time stamp of transaction, and the like) that were received as a part of the transaction request. Additionally, the transaction data can include a transaction identifier, such as a unique transaction request identifier, that was received as a part of the transaction request from the client device 110.

The central service provider 150 also records 815 transactions. In various embodiments, the central service provider 150 records transactions by generating transaction records, as described above, and writing each transaction record to a block in the blockchain. In various embodiments, the central service provider 150 record a transaction by updating one or more traceable directed graphs (e.g., see FIG. 4B) and/or updating a position table (e.g., see FIG. 4E) to reflect the transfer of assets specified by the received transaction request. Therefore, the central service provider 150 maintains the most up-to-date blockchain and position table that reflects the executed transaction.

The verification module 210B of the primary recordation system 120 sends 820 transaction data that were stored by the primary recordation system 120. In one embodiment, the verification module 210B further sends an end time, such as a timestamp, for a time period that corresponds to the transaction data. For example, the transaction data may be derived from transaction requests that were received by the primary recordation system 120 within a time period. An example of a time period may be 5 minutes. In some embodiments, the verification module 210 further sends a snapshot of the updated position table corresponding to the end time. The updated position table reflects positions of an asset held by different parties at the end time of the time period.

In some embodiments, the verification module 210B sends transaction data corresponding to recorded transactions of transaction requests subsequently received by the primary recordation system 120. Therefore, the verification module 210B can continuously send transaction data such that the recorded transactions for subsequent time periods are verified. As an example, the verification module 210B sends transaction data of recorded transactions every 5 minutes.

The central service provider 150 receives the transaction data corresponding to transactions recorded by the primary recordation system 120 and identifies 825 transaction records written in the blockchain that correspond to the transactions recorded by the primary recordation system 120. For example, the central service provider 150 may receive the end time of a time period along with the transaction data and therefore, identifies transaction records that were written in a block of the blockchain during a time period that includes the end time. Therefore, the central service provider 150 identifies transaction records generated by the central service provider 150 from the transaction requests that match the transaction requests that were used by the primary recordation system 120 obtain the transaction data.

The central service provider 150 verifies 830 the transaction data sent by the primary recordation system 120. Generally, the central service provider 150 compares information in the transaction data to the identified transaction records written on the blockchain. For example, the central service provider 150 verifies each unique transaction request identifier in the transaction data by comparing the unique transaction request identifier to an identifier recorded in a transaction record written in the blockchain. As described above, each unique transaction request identifier may be stored in the envelope 515 of a transaction record 540. Therefore, the central service provider 150 matches the unique transaction request identifier of transaction data to a unique transaction request identifier in an envelope of a transaction record to verify that the transaction corresponding to the transaction data was also recorded in the blockchain.

In various embodiments, the central service provider 150 verifies 830 the transaction data by verifying the snapshot of the updated position table at an end time (e.g., timestamp) that was sent in conjunction with the transaction data. For example, the central service provider 150 can identify the positions of an asset held by various parties at the end time by accessing one or both of the directed graphs (e.g., see FIG. 4B) or the position table (e.g., see FIG. 4E) that were updated by the central service provider 150 when recording transactions (e.g., step 815). For example, referring briefly to FIG. 4B, the central service provider 150 can identify the nodes in the one or more trees 405 by matching the appropriate time 445 to the end time (e.g., timestamp) received in conjunction with the transaction data. Similarly, referring to FIG. 4E, the central service provider 150 identifies the appropriate time 445 in the position table that matches the end time received in conjunction with the transaction data. Therefore, the central service provider 150 can verify that the positions of the asset held by the parties at the end time sent by the primary recordation system 120 matches the directed graphs and/or the position table maintained by the central service provider 150.

The central service provider 150 may perform an additional or alternative process for verifying 830 the transaction data. For example, reference is now made to FIG. 8B, which depicts an example flow process for verifying transaction data for a transaction recorded by the primary recordation system 120, in accordance with an embodiment. In this embodiment, the central service provider 150 verifies transaction data for a recorded transaction by determining 855 a hash value that represents the transaction data. For example, the central service provider 150 determines 855 a hash value using the unique transaction request identifier and attributes included in the transaction data. In various embodiments, the generated hash value represents a transaction record (e.g., 540 in FIG. 5A). In some embodiments, the generated hash value represents a block of transactions. As an example, the central service provider 150 determines a hash value for transaction data of each recorded transaction, and executes a pair-wise hashing algorithm to generate a single hash value that represents transaction data of multiple recorded transactions. Therefore, the central service provider 150 verifies 860 the hash value by comparing the generated hash value to a hash value recorded in the blockchain to verify the transactions recorded by the primary recordation system 120.

In various embodiments, the central service provider 150 identifies 835 a discrepancy. For example, the central service provider 150 identifies 865 a discrepancy between a generated hash value of the transaction data and a hash value recorded in the blockchain. Therefore, the central service provider 150 sends 840 a notification of the identified discrepancy to the primary recordation system 120. The primary recordation system 120 can reconcile 845A the discrepancy. Additionally, the central service provider 150 can reconcile 845B the discrepancy, as described above.

Specifically, the reconciliation module 330 of the central service provider 150 sends the notification to the primary recordation system 120 that includes information corresponding to an identified discrepancy. The information of the identified discrepancy includes information corresponding to a suspected block of transactions or a suspected transaction that was identified to have caused the discrepancy. For example, if the discrepancy corresponds to transaction data for a recorded transaction whose generated hash value was not identified as recorded in the blockchain, details included in the transaction data (e.g., the unique transaction request identifier, attributes of the transaction, and the like) are included in the notification sent to the primary recordation system 120.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method for verifying accuracy of a primary recordation system, comprising:
    receiving, by a central service provider having a computer processor, transaction data describing a first set of transactions, each transaction in the first set specifying a transfer of an asset;
    recording, by the central service provider, transactions in the first set of transactions by writing transaction records to blocks in a blockchain;
    receiving, from the primary recordation system, transaction data describing a second set of transactions recorded by the primary recordation system and a snapshot of a position table maintained by the primary recordation system that describes positions of the asset held by one or more parties;
    identifying, using the transaction data describing the second set of transactions, corresponding transaction records of the first set of transactions written to the blockchain;
    determining positions of the asset held by one or more parties;
    verifying the received transaction data describing the second set of transactions recorded by the primary recordation system by:
        comparing the received transaction data describing the second set of transactions to the corresponding transaction records of the first set of transactions written to the blockchain; and comparing positions of the asset held by one or more parties described by the snapshot of the position table to the determined positions of the asset held by one or more parties;

identifying, based on the verifying, an error between the received transaction data describing the second set of transactions and the corresponding transaction records of the first set of transactions written in the blockchain; and sending a notification of the error to the primary recordation system, wherein the primary recordation system is adapted to reconcile the error.

2. The method of claim 1, wherein transaction data describing the second set of transactions comprises:
attributes of the transactions of the second set of transactions recorded by the primary recordation system; and
unique transaction request identifiers that each identifies a transaction from the second set of transactions.

3. The method of claim 2, wherein comparing the received transaction data to the corresponding transaction records comprises:
generating a hash value from at least the attributes and a unique transaction request identifier of the transaction data describing the second set of transactions; and
comparing the generated hash value to a hash value for a corresponding transaction record from the first set of transactions written in the blockchain.

4. The method of claim 3, wherein identifying the error comprises:
identifying a mismatch between the generated hash value and the hash value for the corresponding transaction record written in the blockchain.

5. The method of claim 1, wherein the primary recordation system is adapted to reconcile the identified error using one or more traceable directed graphs maintained by the central service provider.

6. The method of claim 1, wherein comparing the received transaction data to the corresponding transaction records comprises:
comparing a unique transaction request identifier that identifies a transaction of the second set of transactions to a hash value stored in an envelope of a corresponding transaction record of a transaction of the first set of transactions written in the blockchain.

7. The method of claim 1, wherein identifying the corresponding transaction records comprises:
identifying a time period corresponding to the second set of transactions recorded by the primary recordation system; and
identifying the corresponding transaction records written in the blockchain responsive to the identified time period.

8. A non-transitory computer-readable medium comprising computer code that, when executed by a processor, causes the processor to:
receive, by a central service provider, transaction data describing a first set of transactions, each transaction in the first set specifying a transfer of an asset;
record, by the central service provider, transactions in the first set of transactions by writing transaction records to blocks in a blockchain;
receive, from a primary recordation system, transaction data describing a second set of transactions recorded by the primary recordation system and a snapshot of a position table maintained by the primary recordation system that describes positions of the asset held by one or more parties;
identify, using the transaction data describing the second set of transactions, corresponding transaction records of the first set of transactions written to the blockchain;
determine positions of the asset held by one or more parties;
verify the received transaction data describing the second set of transactions recorded by the primary recordation system by:
comparing the received transaction data describing the second set of transactions to the corresponding transaction records of the first set of transactions written to the blockchain; and
comparing positions of the asset held by one or more parties described by the snapshot of the position table to the determined positions of the asset held by one or more parties;
identify, based on the verifying, an error between the received transaction data describing the second set of transactions and the corresponding transaction records of the first set of transactions written in the blockchain; and
send a notification of the error to the primary recordation system, wherein the primary recordation system is adapted to reconcile the error.

9. The non-transitory computer-readable medium of claim 8,
wherein transaction data describing the second set of transactions comprises:
attributes of the transactions of the second set of transactions recorded by the primary recordation system; and
unique transaction request identifiers that each identifies a transaction from the second set of transactions.

10. The non-transitory computer-readable medium of claim 9, wherein the computer code that causes the processor to compare the received transaction data to the corresponding transaction records further comprises computer code that, when executed by the processor, causes the processor to:
generate a hash value from at least the attributes and a unique transaction request identifier of the transaction data describing the second set of transactions; and
compare the generated hash value to a hash value for a corresponding transaction record from the first set of transactions written in the blockchain.

11. The non-transitory computer-readable medium of claim 10, wherein the computer code that causes the processor to identify the error further comprises computer code that, when executed by the processor, causes the processor to:
identify a mismatch between the generated hash value and the hash value for the corresponding transaction record written in the blockchain.

12. The non-transitory computer-readable medium of claim 8, wherein the primary recordation system is adapted to reconcile the identified error using one or more traceable directed graphs maintained by the central service provider.

13. The non-transitory computer-readable medium of claim 8, wherein the computer code that causes the processor to compare the received transaction data to the corresponding transaction records further comprises computer code that, when executed by the processor, causes the processor to:

compare a unique transaction request identifier that identifies a transaction of the second set of transactions to a hash value stored in an envelope of a corresponding transaction record of a transaction of the first set of transactions written in the blockchain.

14. The non-transitory computer-readable medium of claim 8, wherein the computer code that causes the processor to identify the corresponding transaction records further comprises computer code that, when executed by the processor, causes the processor to:
identify a time period corresponding to the second set of transactions recorded by the primary recordation system; and
identify the corresponding transaction records written in the blockchain responsive to the identified time period.

15. A system for verifying accuracy of a primary recordation system, comprising:
a computer processor;
a non-transitory computer-readable medium comprising computer code that, when executed by the computer processor, causes the processor to:
receive, by a central service provider, transaction data describing a first set of transactions, each transaction in the first set specifying a transfer of an asset;
record, by the central service provider, transactions in the first set of transactions by writing transaction records to blocks in a blockchain;
receive, from a primary recordation system, transaction data describing a second set of transactions recorded by the primary recordation system and a snapshot of a position table maintained by the primary recordation system that describes positions of the asset held by one or more parties;
identify, using the transaction data describing the second set of transactions, corresponding transaction records of the first set of transactions written to the blockchain;
determine positions of the asset held by one or more parties;
verify the received transaction data describing the second set of transactions recorded by the primary recordation system by:
comparing the received transaction data describing the second set of transactions to the corresponding transaction records of the first set of transactions written to the blockchain; and
comparing positions of the asset held by one or more parties described by the snapshot of the position table to the determined positions of the asset held by one or more parties;
identify, based on the verifying, an error between the received transaction data describing the second set of transactions and the corresponding transaction records of the first set of transactions written in the blockchain; and
send a notification of the error to the primary recordation system, wherein the primary recordation system is adapted to reconcile the error.

16. The system of claim 15, wherein transaction data describing the second set of transactions comprises:
attributes of the transactions of the second set of transactions recorded by the primary recordation system; and
unique transaction request identifiers that each identifies a transaction from the second set of transactions.

17. The system of claim 16, wherein comparing the received transaction data to the corresponding transaction records comprises:
generating a hash value from at least the attributes and a unique transaction request identifier of the transaction data describing the second set of transactions; and
comparing the generated hash value to a hash value for a corresponding transaction record from the first set of transactions written in the blockchain.

18. The system of claim 17, wherein identifying the error comprises:
identifying a mismatch between the generated hash value and the hash value for the corresponding transaction record written in the blockchain.

19. The system of claim 15, wherein the primary recordation system is adapted to reconcile the identified error using one or more traceable directed graphs maintained by the central service provider.

20. The system of claim 15, wherein comparing the received transaction data to the corresponding transaction records comprises:
comparing a unique transaction request identifier that identifies a transaction of the second set of transactions to a hash value stored in an envelope of a corresponding transaction record of a transaction of the first set of transactions written in the blockchain.

* * * * *